(12) United States Patent
Zhang

(10) Patent No.: US 9,928,129 B2
(45) Date of Patent: Mar. 27, 2018

(54) OPERATION APPARATUS MODULE

(71) Applicant: SK hynix Inc., Gyeonggi-do (KR)

(72) Inventor: Jea-Young Zhang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 415 days.

(21) Appl. No.: 14/716,561

(22) Filed: May 19, 2015

(65) Prior Publication Data

US 2016/0162191 A1 Jun. 9, 2016

(30) Foreign Application Priority Data

Dec. 8, 2014 (KR) ........................ 10-2014-0175012

(51) Int. Cl.
*G06F 3/06* (2006.01)
*G06F 11/07* (2006.01)
*G06F 12/06* (2006.01)

(52) U.S. Cl.
CPC ...... *G06F 11/0751* (2013.01); *G06F 11/0727* (2013.01); *G06F 12/0669* (2013.01)

(58) Field of Classification Search
None
See application file for complete search history.

(56) References Cited

U.S. PATENT DOCUMENTS 8,626,992 B2 * 1/2014 Ono ...................... G11C 29/82
711/103

FOREIGN PATENT DOCUMENTS

| KR | 1019990045299 | 6/1999 |
| KR | 1020060100417 | 9/2006 |

* cited by examiner

*Primary Examiner* — Idriss N Alrobaye
*Assistant Examiner* — Dayton Lewis-Taylor
(74) *Attorney, Agent, or Firm* — IP & T Group LLP

(57) ABSTRACT

An operation apparatus module includes a plurality of operation apparatuses disposed in a preset pattern. Each of the plurality of operation apparatuses includes a storage block suitable for storing self-identification information for identifying a corresponding operation apparatus and peer identification information for identifying one or more peer operation apparatuses of the corresponding operation apparatus; and an identification block suitable for managing the preset pattern by comparing the self-identification information stored in the storage block with the peer identification information transmitted from the peer operation apparatuses.

18 Claims, 11 Drawing Sheets

OPERATION APPARATUS MODULE

CROSS-REFERENCE TO RELATED APPLICATION

This application claims priority under 35 U.S.C. § 119 to Korean Patent Application No. 10-2014-0175012 filed on Dec. 8, 2014 in the Korean Intellectual Property Office, the disclosure of which is incorporated herein by reference in its entirety.

TECHNICAL FIELD

Exemplary embodiments of the present invention relate to a semiconductor design technology and, more particularly, to an operation apparatus module in which a plurality of operation apparatuses of the same operation are disposed in a preset pattern.

DISCUSSION OF THE RELATED ART

For an electronic device to complete complicated functions at high speed, operation apparatuses are arranged to form a single operation apparatus module.

In memory apparatuses such as solid state drives (SSD) there is always a need for increased data transmission speed and data storage capacity. To meet this demand, SSDs have flash memory devices disposed in a preset pattern and operating in parallel.

Likewise, hard drives for high capacity computers (e.g., servers) require increased data transmission speed and data storage capacity. To meet these needs, a redundant array of inexpensive disks (RAID) is used, which includes multiple hard drives.

There are multiple operation apparatuses in a single operation apparatus module, which are in various kinds of storage systems such as a multimedia card in the form of an MMC, an eMMC (embedded MMC), an RS-MMC (reduced size MMC) and a micro-MMC, a secure digital card in the form of an SD, a mini-SD and a micro-SD, a universal serial bus (USB) storage device, a universal flash storage (UFS) device, a compact flash (CF) card, a smart media card and a memory stick or in each of a number of electronic devices which are too diverse to directly enumerate, such as an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device and one of various component elements configuring a computing system.

To get full performance out of an operation apparatus module, multiple operation apparatuses should be disposed in a preset pattern for specific operations. Therefore, even when a single operation apparatus is inoperable, the entire operation apparatus module is inoperable.

Some of the operation apparatuses in the operation apparatus module may be replaced with other operation apparatuses. For example, some flash memory devices in the solid state drive may be replaced with another flash memory device. Therefore, the entire solid state drive may not reach its full performance capability. In the worst case, the solid state drive may not operate at all.

Therefore, it is important to prevent double usage of operation apparatuses by determining whether each of the original operation apparatuses has been replaced.

SUMMARY

Various embodiments are directed to an operation apparatus module in which a plurality of operation apparatuses of the same operation are disposed in a preset pattern, and capable of checking whether each of the plurality of original operation apparatuses is replaced in order to prevent reuse thereof.

In an embodiment, an operation apparatus module may include a plurality of operation apparatuses disposed in a preset pattern. Each of the plurality of operation apparatuses may include a storage block suitable for storing self-identification information for identifying a corresponding operation apparatus and peer identification information for identifying one or more peer operation apparatuses of the corresponding operation apparatus; and an identification block suitable for managing the preset pattern by comparing the self-identification information stored in the storage block with the peer identification information transmitted from the peer operation apparatuses.

According to an embodiment, each of a plurality of operation apparatuses disposed in a preset pattern in a single operation apparatus module may identify its peers.

With the identification, it is possible to prevent reuse of the operation apparatus module including the plurality of operation apparatuses.

DETAILED DESCRIPTION

Figure 1A:
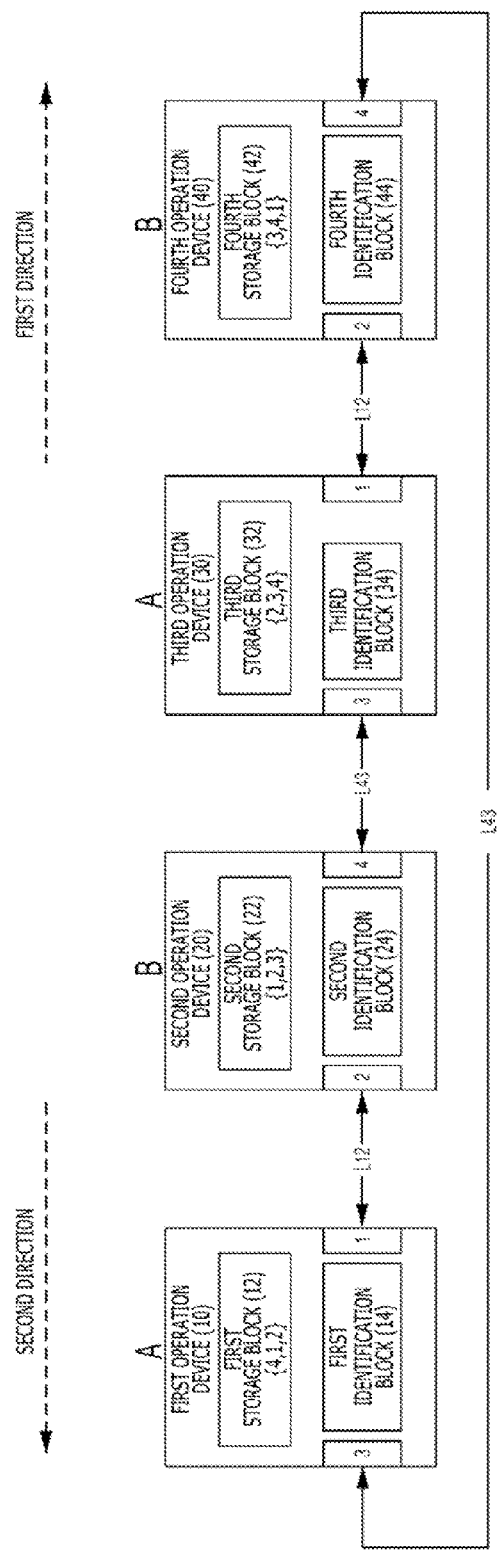
FIGS. 1A and 1B are block diagrams illustrating an operation apparatus module in accordance with a first embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

First Embodiment

Figure 1B:
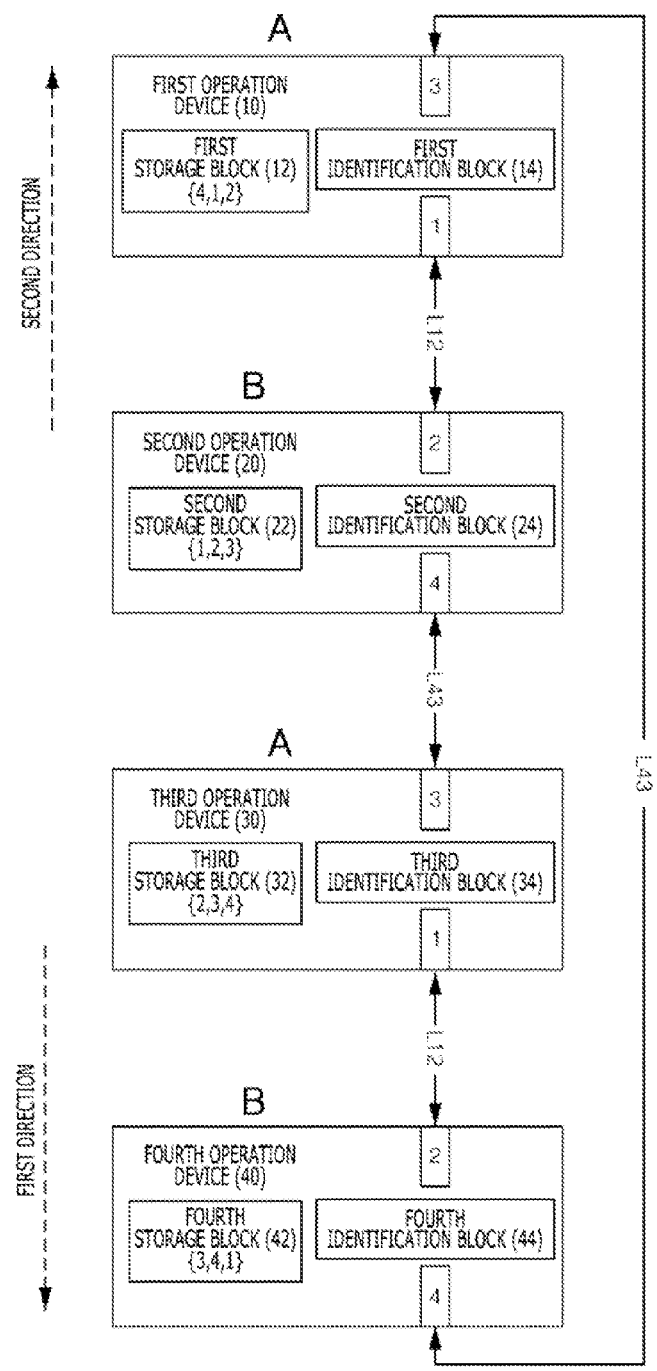

FIGS. 1A and 1B are block diagrams illustrating an operation apparatus module in accordance with a first embodiment.

FIGS. 1A and 1B exemplarily show 4 operation apparatuses 10, 20, 30 and 40 disposed in line with one another in the operation apparatus module. The 4 operation apparatuses 10, 20, 30 and 40 are allocated with self-ID information {1}, {2}, {3} and {4}.

Referring to FIGS. 1A and 1B, the operation apparatus module in accordance with the first embodiment may include a first operation apparatus 10, a second operation apparatus 20, a third operation apparatus 30 and a fourth operation apparatus 40 disposed in a line extending to first and second directions. The first and second directions may be horizontal or vertical, and may be opposite to each other.

The first to fourth operation apparatuses 10, 20, 30 and 40 are classified into first type operation apparatuses A and second type operation apparatuses B according to the preset pattern. In the first embodiment, first type operation apparatuses A and second type operation apparatuses B are alternately disposed in a line. For example, the first and third operation apparatuses 10 and 30 may be the first type operation apparatus A while the second and fourth operation apparatuses 20 and 40 may be the first type operation apparatus B.

Each of the first and third operation apparatuses 10 and 30 of the first type operation apparatuses A may include a first signal transmission terminal 1 toward the first direction and a third signal transmission terminal 3 toward the second direction. Further, each of the second and fourth operation apparatuses 20 and 40 of the second type operation apparatuses B may include a fourth signal transmission terminal 4 toward the first direction and a second signal transmission terminal 2 toward the second direction.

The first signal transmission terminal 1 of the first type operation apparatus A and the second signal transmission terminal 2 of the second type operation apparatus B may be coupled with each other through a first signal transmission line L12. Further, the fourth signal transmission terminal 4 of the second type operation apparatus B and the third signal transmission terminal 3 of the first type operation apparatus A may be coupled with each other through a second signal transmission line L43.

The first to fourth operation apparatuses 10, 20, 30 and 40 may include first to fourth storage blocks 12, 22, 32 and 42 and first to fourth identification blocks 14, 24, 34 and 44, respectively. Each of the first to fourth storage blocks 12, 22, 32 and 42 may be the same as one another. Each of the first to fourth identification blocks 14, 24, 34 and 44 may be the same as one another.

In accordance with an exemplary embodiment of the present invention, each of the first to fourth storage blocks 12, 22, 32 and 42 may store the self-ID information and peer ID information for peer operation apparatuses of corresponding one of the first to fourth operation apparatuses 10, 20, 30 and 40. For example, the first to fourth storage blocks 12, 22, 32 and 42 may store identification information {4, 1, 2}, {1, 2, 3}, {2, 3, 4} and {3, 4, 1} for 2 peer operation apparatuses that are disposed adjacent to their corresponding operation apparatuses 10, 20, 30 and 40 (first and third digits) as well as the self-ID information of the corresponding first to fourth operation apparatuses 10, 20, 30 and 40 (second digit).

For example, in the first operation apparatus 10, the first storage block 12 of the first operation apparatus 10 may store the identification information {4, 1, 2}, that is, the peer ID information {2} for the second operation apparatus 20 disposed adjacent to the first operation apparatus 10 in the first direction and the peer ID information {4} for the fourth operation apparatus 40 disposed adjacent to the first operation apparatus 10 in the second direction along with the self-ID information {1} for the first operation apparatus 10 itself.

Similarly, in the third operation apparatus 30, the third storage block 32 of the third operation apparatus 30 may store the identification information {2, 3, 4}, that is, the peer ID information {4} for the fourth operation apparatus 40 disposed adjacent to the third operation apparatus 30 in the first direction and the peer ID information {2} for the second operation apparatus 20 disposed adjacent to the third operation apparatus 30 in the second direction along with the self-ID information {3} for the third operation apparatus 30 itself.

For reference, although no operation device is disposed in the second direction from the first operation apparatus 10, the identification information {4, 1, 2} may be stored on the assumption that the fourth operation apparatus 40 is disposed in the second direction. This is to allow all the first to fourth operation apparatuses 10, 20, 30 and 40 to identify the operation apparatuses positioned in the first direction and the second direction by using the same algorithm. Similarly, the fourth operation apparatus 40 may store the identification information {3, 4, 1} on the assumption that the first operation apparatus 10 is disposed in the first direction.

During an identification operation period, the first to fourth identification blocks 14, 24, 34 and 44 may check whether the first to fourth operation apparatuses 10, 20, 30 and 40 are disposed in the preset pattern, by using the identification information {4, 1, 2}, {1, 2, 3}, {2, 3, 4} and {3, 4, 1} stored in the storage blocks 12, 22, 32 and 42 of the operation apparatuses 10, 20, 30 and 40, respectively.

For example, the identification operation period may start after a power-up of the operation apparatus module.

Figure 2:
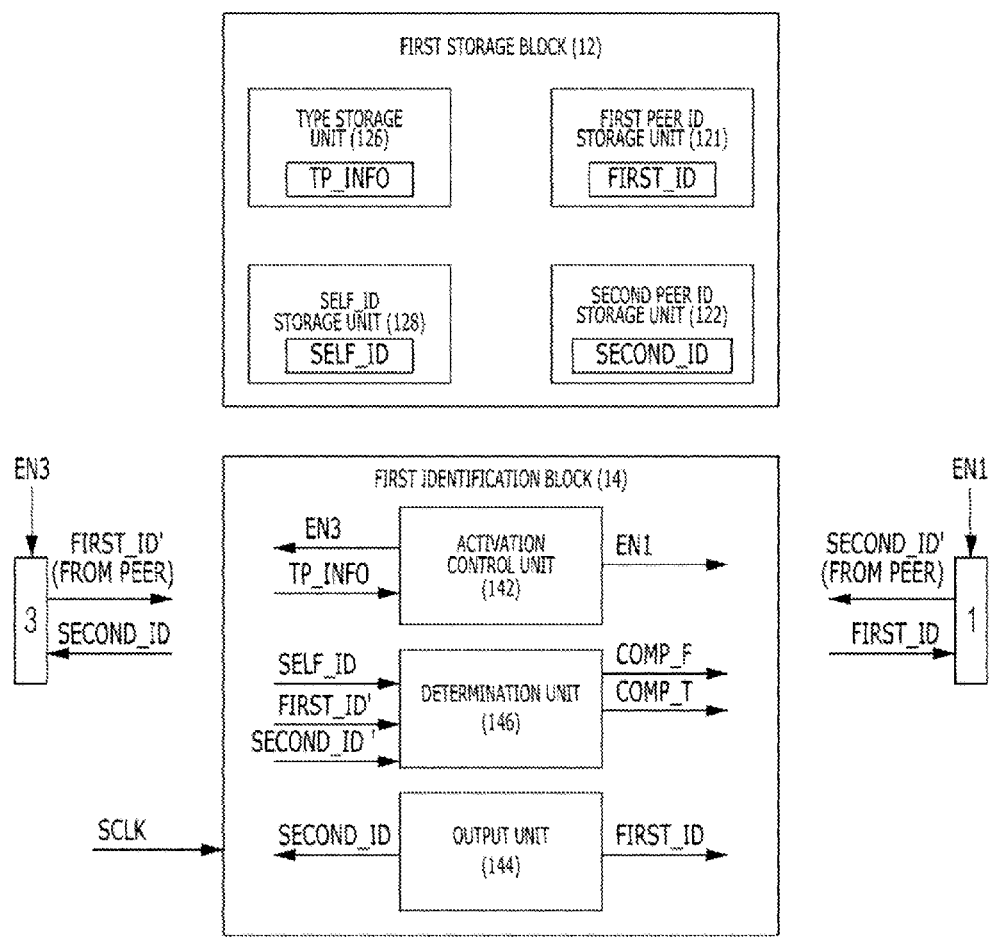
FIG. 2 is a block diagram illustrating a first operation device of an operation apparatus module shown in FIGS. 1A and 1B.

FIG. 2 is a block diagram illustrating the first operation device 10 of the operation apparatus module shown in FIGS. 1A and 1B.

Referring to FIG. 2, the first storage block 12 of the first operation apparatus 10 may include a type storage unit 126, a self-ID storage unit 128, a first peer ID storage unit 121, and a second peer ID storage unit 122. Also, the first identification block 14 of the first operation apparatus 10 may include an activation control unit 142, an output unit 144, and a determination unit 146.

FIG. 2 exemplarily shows the first operation apparatus 10, which is the same as the second to fourth operation apparatuses 20, 30, and 40.

Thus, the second storage block 22 of the second operation apparatus 20 may include a type storage unit 226, a self-ID storage unit 228, a first peer ID storage unit 221, and a second peer ID storage unit 222. Also, the second identification block 24 of the second operation apparatus 20 may include an activation control unit 242, an output unit 244, and a determination unit 246.

The third storage block 32 of the third operation apparatus 30 may include a type storage unit 326, a self-ID storage unit 328, a first peer ID storage unit 321, and a second peer ID storage unit 322. Also, the third identification block 34 of the third operation apparatus 30 may include an activation control unit 342, an output unit 344, and a determination unit 346.

The fourth storage block 42 of the fourth operation apparatus 40 may include a type storage unit 426, a self-ID storage unit 428, a first peer ID storage unit 421, and a second peer ID storage unit 422. Also, the fourth identification block 44 of the fourth operation apparatus 40 may include an activation control unit 442, an output unit 444, and a determination unit 446.

The type storage unit 126 may store type information TP_INFO representing the type of the corresponding operation apparatus 10 between the first type operation apparatus A and the second type operation apparatus B. For example, when the first operation apparatus 10 is the first type operation apparatus A, the type information TP_INFO stored in the type storage unit 126 of the first operation apparatus 10 may have a value of 'A'. Similarly, the type information TP_INFO stored in the type storage unit 226 of the second operation apparatus 20 which is classified as the second type operation apparatus B may have a value of 'B'.

The self-ID storage unit 128 may store self-ID information SELF_ID for the corresponding operation apparatus 10. Namely, when the identification information for the first operation apparatus 10 has the value of '{1}', '{1}' may be stored as the self-ID information SELF_ID in the self-ID storage unit 128 of the first operation apparatus 10. Similarly, when identification information for identifying the second operation apparatus 20 has the value of '{2}', '{2}' may be stored as the self-ID information SELF_ID in the self-ID storage unit 228 of the second operation apparatus 20.

The first peer ID storage unit 121 may store first peer ID information FIRST_ID for an operation device disposed in the first direction of the corresponding operation apparatus 10. That is to say, since the second operation apparatus 20 is disposed in the first direction of the first operation apparatus 10, the value of {2} as the first peer ID information representing the second operation apparatus 20 may be stored in the first peer ID storage unit 121 of the first operation apparatus 10. Similarly, since the third operation apparatus 30 is disposed in the first direction of the second operation apparatus 20, the value of '{3}' as the first peer ID information representing the third operation apparatus 30 may be stored in the first peer ID storage unit 221 of the second operation apparatus 20.

The second peer ID storage unit 122 may store second peer ID information SECOND_ID for an operation device disposed in the second direction of the corresponding operation apparatus 10. That is to say, since the fourth operation apparatus 40 is disposed in the second direction of the first operation apparatus 10, the value of '{4}' as the second peer ID information representing the fourth operation apparatus 40 may be stored in the second peer ID storage unit 122 of the first operation apparatus 10. Similarly, since the first operation apparatus 10 is disposed in the second direction of the second operation apparatus 20, the value of '{1}' as the second peer ID information representing the first operation apparatus 10 may be stored in the second peer ID storage unit 222 of the second operation apparatus 20.

The activation control unit 142 may activate one and deactivate the other one between a group of the first and second signal transmission terminals 1 and 2 and a group of the third and fourth signal transmission terminals 3 and 4 during the identification operation period. In other words, when the first and second signal transmission terminals 1 and 2 are activated, the third and fourth signal transmission terminals 3 and 4 are deactivated. Conversely, when the third and fourth signal transmission terminals 3 and 4 are activated, the first and second signal transmission terminals 1 and 2 are deactivated.

As described above, the first and third signal transmission terminals 1 and 3 may be included in each of the first and third operation apparatuses 10 and 30 which are classified as the first type operation apparatuses A. Also, the second and fourth signal transmission terminals 2 and 4 may be included in each of the second and fourth operation apparatuses 20 and 40 which are classified as the second type operation apparatuses B.

Accordingly, the activation control unit 142 of the first operation apparatus 10 classified as the first type operation apparatus A may operate in such a way as to deactivate the third signal transmission terminal 3 during activation of the first signal transmission terminal 1 and to activate the third signal transmission terminal 3 during deactivation of the first signal transmission terminal 1. To this end, the activation control unit 142 of the first operation apparatus 10 may generate a first enable signal EN1 to activate the first signal transmission terminal 1 and a third enable signal E13 to activate the third signal transmission terminal 3.

Similarly, the activation control unit 242 of the second operation apparatus 20 classified as the second type operation apparatus B may operate in such a way as to deactivate the fourth signal transmission terminal 4 during activation of the second signal transmission terminal 2 and to activate the fourth signal transmission terminal 4 during deactivation of the second signal transmission terminal 2. To this end, the activation control unit 242 of the second operation apparatus 20 may generate a second enable signal EN2 to activate the second signal transmission terminal 2 and a fourth enable signal EN4 to activate the fourth signal transmission terminal 4.

In detail, during the identification operation period, the activation control unit 142 may activate one and deactivate the other one between the group of the first and second signal transmission terminals 1 and 2 and the group of the third and fourth signal transmission terminals 3 and 4 according to the value stored in the type storage unit 126.

For example, during the identification operation period, the activation control unit 142 of the first operation apparatus 10 may activate the first signal transmission terminal 1 according to the value stored in the type storage unit 126.

Similarly, during the identification operation period, the activation control unit 242 of the second operation apparatus 20 may activate the second signal transmission terminal 2 according to the value stored in the type storage unit 126.

Further, the activation control unit 142 may deactivate one and activate the other one between the group of the first and second signal transmission terminals 1 and 2 and the group of the third and fourth signal transmission terminals 3 and 4 a preset number of toggles of a source clock SCLK after the start of the identification operation period.

For example, in the first operation apparatus 10, which is the first type operation apparatus A, the activation control unit 142 of the first operation apparatus 10 may perform a first switch operation of activating the first signal transmission terminal 1 and deactivating the third signal transmission terminal 3 during the preset number of toggles of the source clock SCLK at start of the identification operation period, and then perform a second switch operation of deactivating the first signal transmission terminal 1 and activating the third signal transmission terminal 3 the preset number of toggles of the source clock SCLK after the start of the identification operation period.

Similarly, in the second operation apparatus 20, which is the second type operation apparatus B, the activation control unit 242 of the second operation apparatus 20 may perform a first switch operation of activating the second signal transmission terminal 2 and deactivating the fourth signal transmission terminal 4 during the preset number of toggles of the source clock SCLK at start of the identification operation period, and then perform a second switch operation of deactivating the second signal transmission terminal 2 and activating the fourth signal transmission terminal 4 the preset number of toggles of the source clock SCLK after the start of the identification operation period.

The output unit 144 may output one of the first peer ID information FIRST_ID stored in the first peer ID storage unit 121 of the corresponding operation apparatus 10 and the second peer ID information SECOND_ID stored in the second peer ID storage unit 122 of the corresponding operation apparatus 10, to a peer operation apparatus of the corresponding operation apparatus 10, according to the operation of the activation control unit 142 during the identification operation period.

Namely, when the first signal transmission terminal 1 is activated during the first switch operation by the activation control unit 142 of the first operation apparatus 10, the value '{2}' of the first peer ID information FIRST_ID stored in the first peer ID storage unit 121 of the first operation apparatus 10 may be outputted to the second operation apparatus 20 disposed in the first direction of the first operation apparatus 10, through the first signal transmission terminal 1. Also, when the third signal transmission terminal 3 is activated during the second switch operation by the activation control unit 142 of the first operation apparatus 10, the value '{4}' of the second peer ID information SECOND_ID stored in the second peer ID storage unit 122 of the first operation apparatus 10 may be outputted to the fourth operation apparatus 40 disposed in the second direction of the first operation apparatus 10, through the third signal transmission terminal 3.

Similarly, when the second signal transmission terminal 2 is activated during the first switch operation by the activation control unit 242 of the second operation apparatus 20, the value '{1}' of the second peer ID information SECOND_ID stored in the second peer ID storage unit 222 of the second operation apparatus 20 may be outputted to the first operation apparatus 10 disposed in the second direction of the second operation apparatus 20, through the second signal transmission terminal 2. Also, when the fourth signal transmission terminal 4 is activated during the second switch operation by the activation control unit 242 of the second operation apparatus 20, the value '{3}' of the first peer ID information FIRST_ID stored in the first peer ID storage unit 221 of the second operation apparatus 20 may be outputted to the third operation apparatus 30 disposed in the first direction of the second operation apparatus 20, through the fourth signal transmission terminal 4.

The determination unit 146 may compare one of the first and second peer ID information SECOND_ID' or FIRST_ID' inputted from the peer operation apparatuses of the corresponding operation apparatus 10 through the first and third signal transmission terminals 1 and 3 activated in response to the first and third enable signals EN1 and EN3 and the self-ID information SELF_ID stored in the self-ID storage unit 128, and may determine whether they correspond to each other during the identification operation period.

That is to say, the determination unit 146 may perform a first determination operation, wherein the determination unit 146 may compare the second peer ID information SECOND_ID' inputted from the second operation apparatus 20 through the first signal transmission terminal 1 activated by the first switch operation of the activation control unit 142 of the first operation apparatus 10 with the self-ID information SELF_ID stored in the self-ID storage unit 128 of the first operation apparatus 10, and may determine whether the second peer ID information SECOND_ID' is substantially the same as the self-ID information SELF_ID.

In a normal situation where the second operation apparatus 20 is disposed in the first direction of the first operation apparatus 10, the second peer ID information SECOND_ID' inputted through the first signal transmission terminal 1 of the first operation apparatus 10 may have the value '{1}' of the second peer ID information SECOND_ID stored in the second peer ID storage unit 222 of the second operation apparatus 20. Accordingly, when the second peer ID information SECOND_ID' inputted through the first signal transmission terminal 1 of the first operation apparatus 10 is compared with the value '{1}' of the self-ID information SELF_ID stored in the self-ID storage unit 128 of the first operation apparatus 10, they may be substantially the same as each other, and a result of the first determination operation may be successful.

Conversely, in an abnormal situation where not the second operation apparatus 20 but the third operation apparatus 30 is disposed in the first direction of the first operation apparatus 10, the second peer ID information SECOND_ID/ inputted through the first signal transmission terminal 1 of the first operation apparatus 10 may have the value '{2}' of the second peer ID information SECOND_ID stored in the second peer ID storage unit 322 of the third operation apparatus 30. Accordingly, when the second peer ID information SECOND_ID' inputted through the first signal transmission terminal 1 of the first operation apparatus 10 is compared with the value '{1}' of the self-ID information SELF_ID stored in the self-ID storage unit 128 of the first operation apparatus 10, they may not be substantially the same as each other, and a result of the first determination operation may fail.

Similarly, the determination unit 146 may perform a second determination operation, wherein the determination unit 146 may compare the first peer ID information FIRST_ID' inputted from the fourth operation apparatus 40 through the third signal transmission terminal 3 activated by the second switch operation of the activation control unit 142 of the first operation apparatus 10 with the self-ID information SELF_ID stored in the self-ID storage unit 128 of the first operation apparatus 10, and may determine whether the first peer ID information FIRST_ID' is substantially the same as the self-ID information SELF_ID.

In a normal situation where the fourth operation apparatus 40 is disposed in the second direction of the first operation apparatus 10, the first peer ID information FIRST_ID' inputted through the third signal transmission terminal 3 of the first operation apparatus 10 may have the value '{1}' of the first peer ID information FIRST_ID stored in the first peer ID storage unit 421 of the fourth operation apparatus 40. Accordingly, when the first peer ID information FIRST_ID' inputted through the third signal transmission terminal 3 of the first operation apparatus 10 is compared with the value '{1}' of the self-ID information SELF_ID' stored in the self-ID storage unit 128 of the first operation apparatus 10, they may be substantially the same as each other, and a result of the second determination operation may be successful.

Conversely, in an abnormal situation where not the fourth operation apparatus 40 but the third operation apparatus 30 is disposed in the second direction of the first operation apparatus 10, the first peer ID information FIRST_ID' inputted through the third signal transmission terminal 3 of the first operation apparatus 10 may have the value '{4}' of the first peer ID information FIRST_ID stored in the first peer ID storage unit 321 of the third operation apparatus 30. Accordingly, when the first peer ID information FIRST_ID' inputted through the third signal transmission terminal 3 of the first operation apparatus 10 is compared with the value '{1}' of the self-ID information SELF_ID stored in the self-ID storage unit 128 of the first operation apparatus 10, they may not be substantially the same as each other, and a result of the second determination operation may fail.

Only when the second operation apparatus 20 is normally disposed in the first direction of the first operation apparatus 10 and the fourth operation apparatus 40 is normally disposed in the second direction of the first operation apparatus 10, both the first determination operation and the second determination operation may be successful, and the first operation apparatus 10 may end the identification operation period. If even one of the first determination operation and the second determination operation fails, the first operation apparatus 10 may not end the identification operation period, which may not allow the operation apparatus module to perform further processes and thus prevent reuse of the operation apparatus module.

The determination unit 246 may perform a third determination operation, wherein the determination unit 146 may compare the first peer ID information FIRST_ID' inputted from the first operation apparatus 10 through the second signal transmission terminal 2 activated by the first switch operation of the activation control unit 242 of the second operation apparatus 20 with the self-ID information SELF_ID stored in the self-ID storage unit 228 of the second operation apparatus 20, and may determine whether the first peer ID information FIRST_ID' is substantially the same as the self-ID information SELF_ID.

In a normal situation where the first operation apparatus 10 is disposed in the second direction of the second operation apparatus 20, the first peer ID information FIRST_ID inputted through the second signal transmission terminal 2 of the second operation apparatus 20 may have the value '{2}' of the first peer ID information FIRST_ID stored in the first peer ID storage unit 121 of the first operation apparatus 10. Accordingly, when the first peer ID information FIRST_ID' inputted through the second signal transmission terminal 2 of the second operation apparatus 20 is compared with the value '{2}' of the self-ID information SELF_ID stored in the self-ID storage unit 228 of the second operation apparatus 20, they may be substantially the same, and a result of the third determination operation may be successful.

Conversely, in an abnormal situation where not the first operation apparatus 10 but the fourth operation apparatus 40 is disposed in the second direction of the second operation apparatus 20, the first peer ID information FIRST_ID' inputted through the second signal transmission terminal 2 of the second operation apparatus 20 may have the value '{1}' of the first peer ID information FIRST_ID stored in the first peer ID storage unit 421 of the fourth operation apparatus 40. Accordingly, when the first peer ID information FIRST_ID' inputted through the second signal transmission terminal 2 of the second operation apparatus 20 is compared with the value '{2}' of the self-ID information SELF_ID stored in the self-ID storage unit 228 of the second operation apparatus 20, they may not be substantially the same as each other, and a result of the third determination operation may fail.

Similarly, the determination unit 246 may perform a fourth determination operation, wherein the determination unit 146 may compare the second peer ID information SECOND_ID' inputted from the third operation apparatus 30 through the fourth signal transmission terminal 4 activated by the second switch operation of the activation control unit 242 of the second operation apparatus 20 with the self-ID information SELF_ID stored in the self-ID storage unit 228 of the second operation apparatus 20, and may determine whether the second peer ID information SECOND_ID' is substantially the same as the self-ID information SELF_ID.

In a normal situation where the third operation apparatus 30 is disposed in the first direction of the second operation apparatus 20, the second peer ID information SECOND_ID' inputted through the fourth signal transmission terminal 4 of the second operation apparatus 20 may have the value '{2}' of the second peer ID information SECOND_ID stored in the second peer ID storage unit 322 of the third operation apparatus 30. Accordingly, when the second peer ID information SECOND_ID' inputted through the fourth signal transmission terminal 4 of the second operation apparatus 20 is compared with the value '{2}' of the self-ID information SELF_ID stored in the self-ID storage unit 228 of the second operation apparatus 20, they may be substantially the same as each other, and a result of the fourth determination operation may be successful.

Conversely, in an abnormal situation where not the third operation apparatus 30 but the fourth operation apparatus 40 is disposed in the first direction of the second operation apparatus 20, the second peer ID information SECOND_ID' inputted through the fourth signal transmission terminal 4 of the second operation apparatus 20 may have the value '{3}' of the second peer ID information SECOND_ID stored in the second peer ID storage unit 422 of the fourth operation apparatus 40. Accordingly, when the second peer ID information SECOND_ID' inputted through the fourth signal transmission terminal 4 of the second operation apparatus 20 is compared with the value '{2}' of the self-ID information SELF_ID stored in the self-ID storage unit 228 of the second operation apparatus 20, they may not be substantially the same as each other, and a result of the fourth determination operation may fail.

Only when the first operation apparatus 10 is normally disposed in the second direction of the second operation apparatus 20 and the third operation apparatus 30 is normally disposed in the first direction of the second operation apparatus 20, both the third determination operation and the fourth determination operation may be successful, and the second operation apparatus 20 may end the identification operation period. If even one of the third determination operation and the fourth determination operation fails, the second operation apparatus 20 may not end the identification operation period, which may not allow the operation apparatus module to perform further processes and thus prevent reuse of the operation apparatus module.

The end of the identification operation period due to the success of the first and second determination operations for the first type operation apparatus A and the third and fourth determination operations for the second type operation apparatus B may affect the next operation of the operation apparatus module after the end of the identification operation period. For example, when the operation apparatus module is supposed to start the identification operation period at the power-up of the operation apparatus module and to perform the next operation after the end of the identification operation period, the operation apparatus module may perform the next operation only in when both the first type operation apparatus A and the second type operation apparatus B are precisely disposed at predetermined positions. Otherwise, the identification operation period may not end and the next operation may not be performed.

Figure 3A:
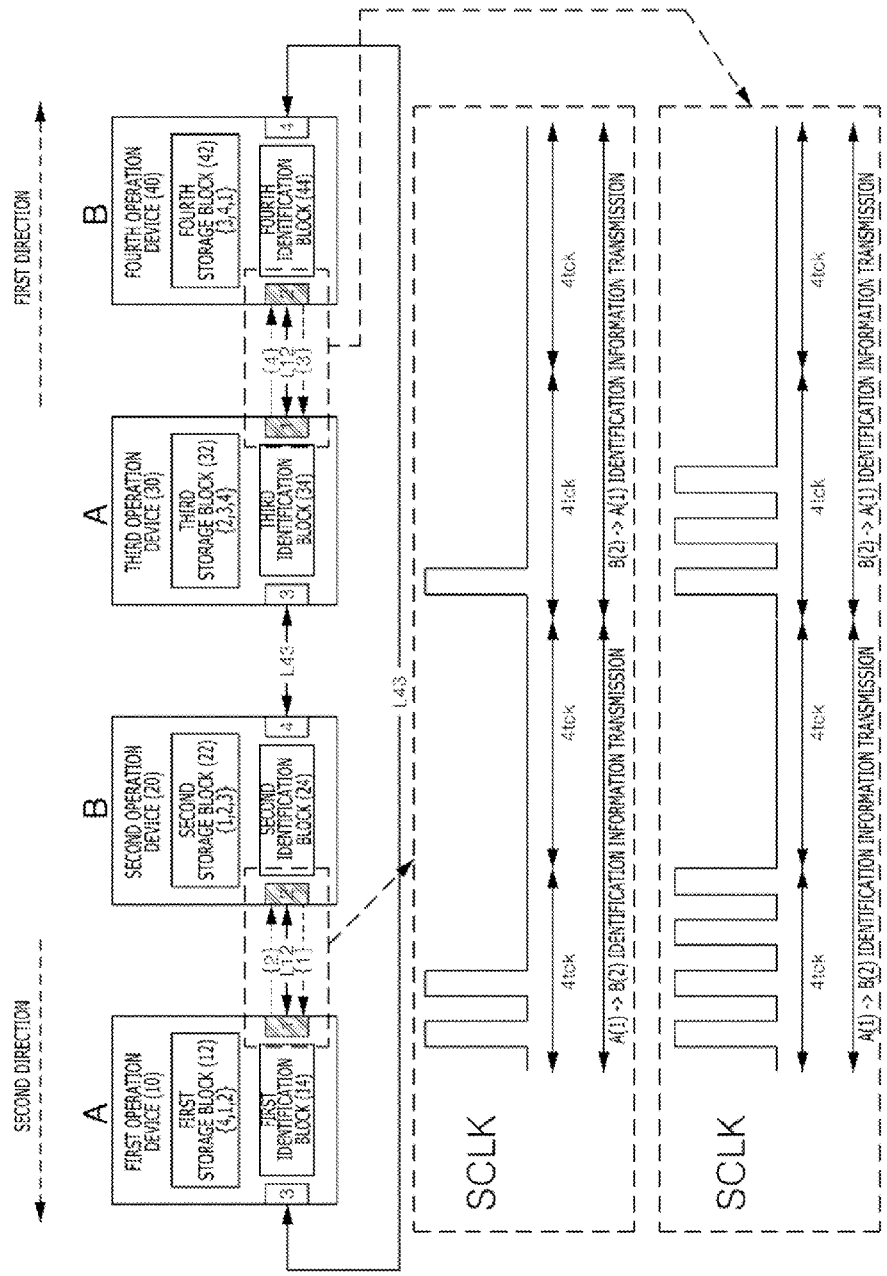
FIGS. 3A and 3B are timing diagrams illustrating an operation of an operation apparatus module shown in FIGS. 1A and 2.
Figure 3B:
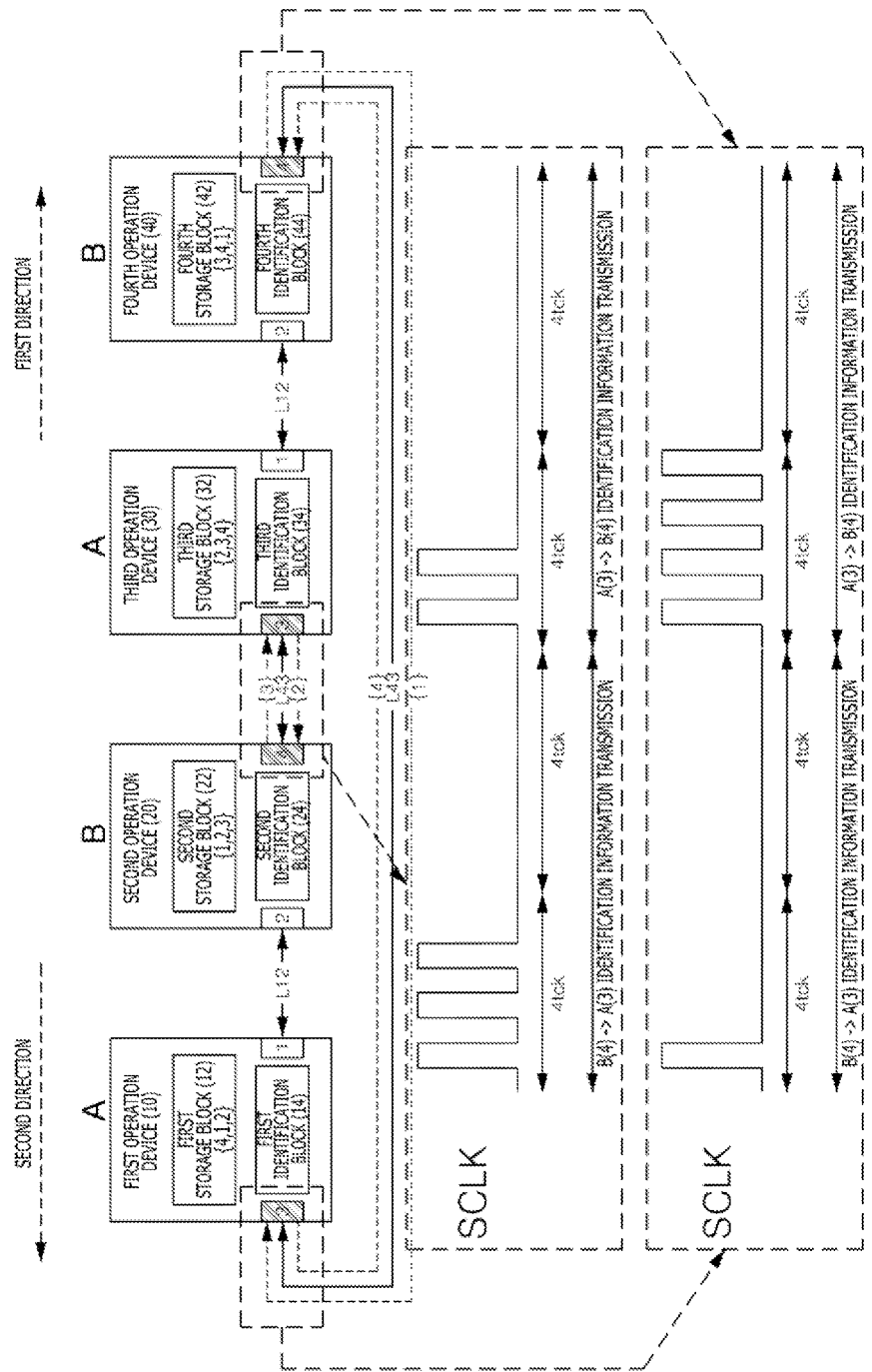

FIGS. 3A and 3B are timing diagrams illustrating an operation of the operation apparatus module shown in FIGS. 1A and 2.

FIGS. 3A and 3B exemplarily show the operation of the operation apparatus module having the first to fourth operation apparatuses 10, 20, 30 and 40 disposed in horizontal line, as shown in FIG. 1A.

FIG. 3A shows the first to fourth operation apparatuses 10, 20, 30 and 40 performing the first switch operation during the identification operation period.

In detail, in each of the first and third operation apparatuses 10 and 30 of the first type operation apparatuses A, the first signal transmission terminal 1 toward the first direction is activated, and the third signal transmission terminal 3 toward the second direction is deactivated. In each of the second and fourth operation apparatuses 20 and 40 of the second type operation apparatuses B, the second signal transmission terminal 2 toward the second direction is activated, and the fourth signal transmission terminal 4 toward the first direction is deactivated.

Accordingly, the first and second peer ID information {1}, {2}, {3} and {4} may be exchanged through the first signal transmission line L12 which couples the first and second signal transmission terminals 1 and 2. Conversely, the first and second peer ID information {1}, {2}, {3} and {4} may not be exchanged through the second signal transmission line L43 which couples the third and fourth signal transmission terminals 3 and 4.

For example, during the first switch operation of first 8 cycles (4tck+4tck) of the source clock SCLK, the first peer ID information {2} and {4} may be outputted from the first and third operation apparatuses 10 and 30 of the first type operation apparatuses A to the second and fourth operation apparatuses 20 and 40 of the second type operation apparatuses B.

In other words, during the first switch operation of the first 8 cycles of the source clock SCLK, the first peer ID information {2} stored in the first peer ID storage unit 121 of the first operation apparatus 10 may be outputted through the first signal transmission terminal 1. For example, the first peer ID information {2} stored in the first peer ID storage unit 121 of the first operation apparatus 10 may be outputted during 2 toggles of the source clock SCLK. The second operation apparatus 20 may receive the first peer ID information {2} inputted through the second signal transmission terminal 2 from the first operation apparatus 10, and the determination unit 246 may determine whether the received first peer ID information {2} has the same value as the self-ID information {2} stored in the self-ID storage unit 228 after 2 toggles of the source clock SCLK.

Similarly, during the first switch operation of the first 8 cycles of the source clock SCLK, the first peer ID information {4} stored in the first peer ID storage unit 321 of the third operation apparatus 30 may be outputted through the first signal transmission terminal 1. For example, the first peer ID information {4} stored in the first peer ID storage unit 321 of the third operation apparatus 30 may be outputted during 4 toggles of the source clock SCLK. The fourth operation apparatus 40 may receive the first peer ID information {4} inputted through the second signal transmission terminal 2 from the third operation apparatus 30 and the determination unit 346 may determine whether the received first peer ID information {4} has the same value as the self-ID information {4} stored in the self-ID storage unit 428 after 4 toggles of the source clock SCLK.

For example, during the second switch operation of first 8 cycles (4tck+4tck) of the source clock SCLK, the second peer ID information {1} and {3} may be outputted from the second and fourth operation apparatuses 20 and 40 of the second type operation apparatuses B to the first and third operation apparatuses 10 and 30 of the first type operation apparatuses A.

In other words, during the first switch operation of second 8 cycles of the source clock SCLK, the second peer ID information {1} stored in the second peer ID storage unit 222 of the second operation apparatus 20 may be outputted through the second signal transmission terminal 2. For example, the second peer ID information {1} stored in the second peer ID storage unit 222 of the second operation apparatus 20 may be outputted during a single toggle of the source clock SCLK. The first operation apparatus 10 may receive the second peer ID information {1} inputted through the first signal transmission terminal 1 from the second operation apparatus 20, and the determination unit 146 may determine whether the received second peer ID information {1} has the same value as the self-ID information {1} stored in the self-ID storage unit 128 after the single toggle of the source clock SCLK.

Similarly, during the first switch operation of the second 8 cycles of the source clock SCLK, the second peer ID information {3} stored in the second peer ID storage unit 422 of the fourth operation apparatus 40 may be outputted through the second signal transmission terminal 2. For example, the second peer ID information {3} stored in the second peer ID storage unit 422 of the fourth operation apparatus 40 may be outputted during 3 toggles of the source clock SCLK. The third operation apparatus 30 may receive the second peer ID information {3} inputted through the first signal transmission terminal 1 from the fourth operation apparatus 40, and the determination unit 346 may determine whether the received second peer ID information {3} has the same value as the self-ID information {3} stored in the self-ID storage unit 328 after 3 toggles of the source clock SCLK.

FIG. 3B shows the first to fourth operation apparatuses 10, 20, 30 and 40 performing the second switch operation during the identification operation period.

In detail, in each of the first and third operation apparatuses 10 and 30 of the first type operation apparatuses A, the first signal transmission terminal 1 toward the first direction is deactivated, and the third signal transmission terminal 3 toward the second direction is activated. In each of the second and fourth operation apparatuses 20 and 40 of the second type operation apparatuses B, the second signal transmission terminal 2 toward the second direction is deactivated, and the fourth signal transmission terminal 4 toward the first direction is activated.

Accordingly, the first and second peer ID information {1}, {2} {3} and {4} may be exchanged through the second signal transmission line L43 which couples the third and fourth signal transmission terminals 3 and 4. Conversely, the first and second peer ID information {1}, {2}, {3} and {4} may not be exchanged through the first signal transmission line L12 which couples the first and second signal transmission terminals 1 and 2.

For example, during the second switch operation of first 8 cycles (4tck+4tck) of the source dock SCLK, the first peer ID information {3} and {1} is outputted from the second and fourth operation apparatuses 20 and 40 of the second type operation apparatuses B to the third and first operation apparatuses 30 and 10 of the first type operation apparatuses A.

Namely, during the second switch operation of the first 8 cycles of the source clock SCLK, the first peer ID information {3} stored in the first peer ID storage unit 221 of the second operation apparatus 20 may be outputted through the fourth signal transmission terminal 4. For example, the first peer ID information {3} stored in the first peer ID storage unit 221 of the second operation apparatus 20 may be outputted during 3 toggles of the source clock SCLK. The third operation apparatus 30 may receive the first peer ID information {3} inputted through the third signal transmission terminal 3 from the second operation apparatus 20, and the determination unit 346 may determine whether the received first peer ID information {3} has the same value as the self-ID information {3} stored in the self-ID storage unit 328 after 3 toggles of the source clock SCLK.

Similarly, during the second switch operation of the first 8 cycles of the source clock SCLK, the first peer ID information {1} stored in the first peer ID storage unit 421 of the fourth operation apparatus 40 may be outputted through the fourth signal transmission terminal 4. The first peer ID information {1} stored in the first peer ID storage unit 421 of the fourth operation apparatus 40 may be outputted during a single toggle of the source clock SCLK. The first operation apparatus 10 may receive the first peer ID information {1} inputted through the third signal transmission terminal 3 from the fourth operation apparatus 40, and the determination unit 146 may determine whether the received first peer ID information {1} has the same value as the self-ID information {1} stored in the self-ID storage unit 128 after the single toggle of the source clock SCLK.

For example, during the second switch operation of second 8 cycles (4tck+4tck) of the source clock SCLK, the second peer ID information {2} and {4} may be outputted from the third and first operation apparatuses 30 and 10 of the first type operation apparatuses A to the second and fourth operation apparatuses 20 and 40 of the second type operation apparatuses B.

Namely, during the second switch operation of the second 8 cycles of the source clock SCLK, the second peer ID information {2} stored in the second peer ID storage unit 322 of the third operation apparatus 30 may be outputted through the third signal transmission terminal 3. The second peer ID information {2} stored in the second peer ID storage unit 322 of the third operation apparatus 30 may be outputted during 2 toggles of the source clock SCLK. The second operation apparatus 20 may receive the second peer ID information {2} inputted through the fourth signal transmission terminal 4 from the third operation apparatus 30, and the determination unit 246 may determine whether the received second peer ID information {2} has the same value as the self-ID information {2} stored in the self-ID storage unit 228 after 2 toggles of the source clock SCLK.

Similarly, during the second switch operation of the second 8 cycles of the source clock SCLK, the second peer ID information {4} stored in the second peer ID storage unit 122 of the first operation apparatus 10 may be outputted through the third signal transmission terminal 3. For example, the second peer ID information {4} stored in the second peer ID storage unit 122 of the first operation apparatus 10 may be outputted during 4 toggles of the source clock SCLK. The fourth operation apparatus 40 may receive the second peer ID information {4} inputted through the fourth signal transmission terminal 4 from the first operation apparatus 10, and the determination unit 446 may determine whether the received second peer ID information {4} has the same value as the self-ID information {4} stored in the self-ID storage unit 428 after 4 toggles of the source clock SCLK.

As described above as an example, the operation apparatus module may comprise the first to fourth operation apparatuses 10, 20, 30 and 40. Accordingly, 2-bit data are sufficient for the first and second peer ID information {1}, {2}, {3} and {4} of the first to fourth operation apparatuses 10, 20, 30 and 40. Four (4) toggles of the source clock SCLK may be required at maximum. However, the above description exemplarily discloses that the first and second peer ID information {1}, {2} {3} and {4} is transferred during each of the first and second switch operations of first and second 8 cycles of the source clock SCLK in order to secure a sufficient margin midway due to the continuous transmission of the first and second peer ID information {1}, {2}, {3} and {4}, and in preparation for the lack of means for simultaneously applying the source clock SCLK to all of the first to fourth operation apparatuses 10, 20, 30 and 40. The margin of 4 cycles (4tck) of the source clock SCLK after the transmission of the first or second peer ID information {1}, {2}, {3} and {4} in each of the first and second 8 cycles, as shown in FIGS. 3A and 3B, is an example, which may vary according to design.

Second Embodiment

Figure 4:
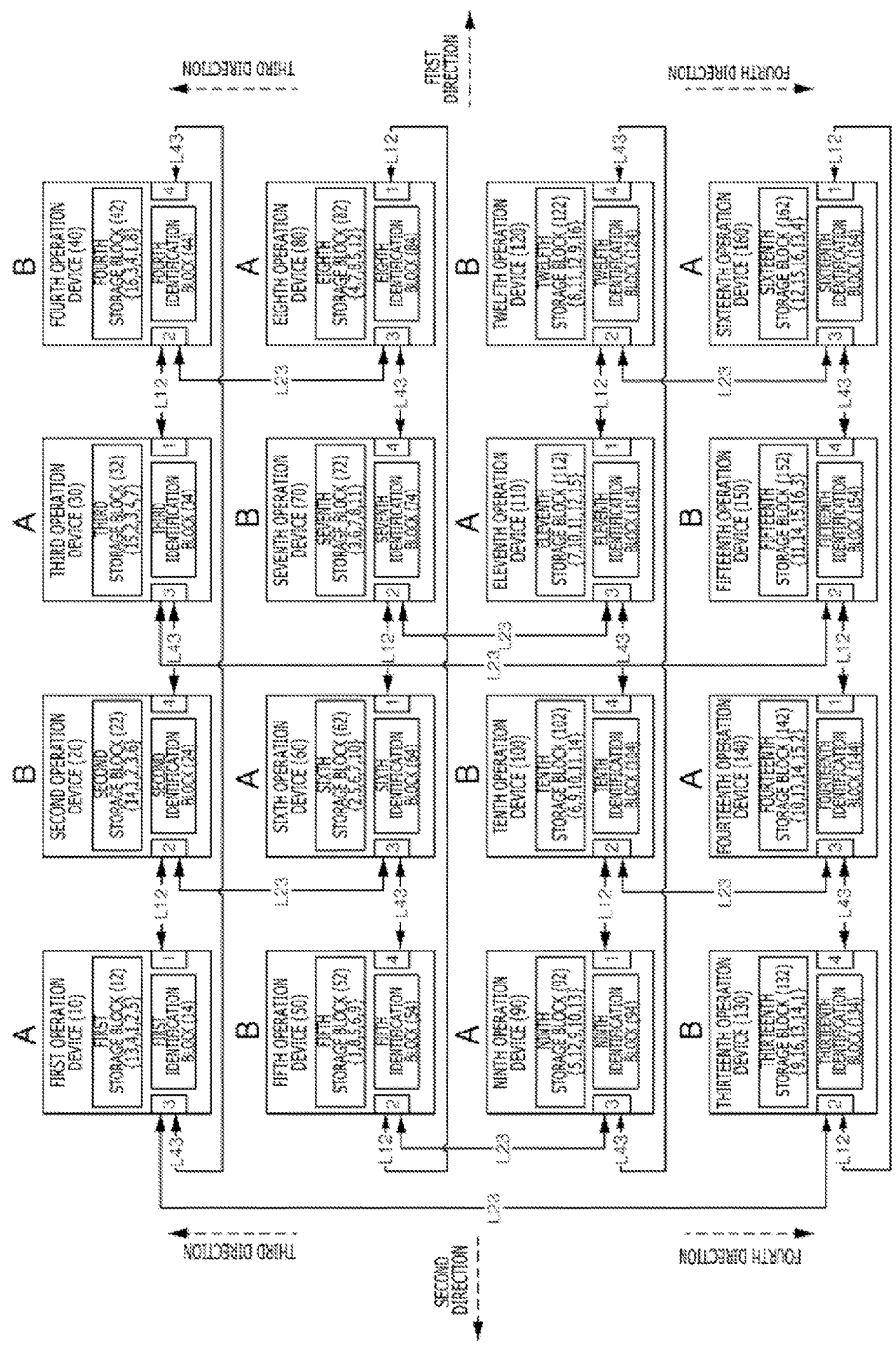
FIG. 4 is a block diagram illustrating an operation apparatus module in accordance with a second embodiment.

FIG. 4 is a block diagram illustrating an operation apparatus module in accordance with a second embodiment.

FIG. 4 exemplarily show 16 operation apparatuses 10, 20, 30, 40, 50, 60, 70, 80, 90, 100, 110, 120, 130, 140, 150 and 160 disposed in an array pattern in the operation apparatus module. The 16 operation apparatuses 10, 20, 30, 40, 50, 60, 70, 80, 90, 100, 110, 120, 130, 140, 150 and 160 are allocated with self-ID information {1}, {2}, {3}, {4}, {5}, {6}, {7}, {8}, {9}, {10}, {11}, {12}, {13}, {14}, {15} and {16}.

Referring to FIG. 4, the operation apparatus module in accordance with the second embodiment may include a first operation apparatus 10, a second operation apparatus 20, a third operation apparatus 30, a fourth operation apparatus 40, a fifth operation device 50, a sixth operation device 60, a seventh operation device 70, an eighth operation device 80, a ninth operation device 90, a tenth operation apparatus 100, an eleventh operation apparatus 110, a twelfth operation apparatus 120, a thirteenth operation apparatus 130, a fourteenth operation apparatus 140, a fifteenth operation apparatus 150 and a sixteenth operation apparatus 160, which are disposed adjacent to one another in the array pattern extending in 4 directions. The first and second directions may be horizontal or vertical, and may be opposite to each other. The third and fourth directions may be horizontal or vertical, and may be opposite to each other.

The first to sixteenth operation apparatuses 10 to 160 are classified into first type operation apparatuses A and second type operation apparatuses B according to the disposition type of the preset pattern. In the second embodiment, first type operation apparatuses A and second type operation apparatuses B are alternately disposed in the array pattern. For example, among the first to sixteenth operation devices 10 to 160 in the array pattern, odd numbered operation apparatuses in the horizontal or vertical direction may be set as the first type operation apparatus A while even numbered operation apparatuses in the horizontal or vertical direction may be set as the second type operation apparatus B, as shown in FIG. 4.

Referring to FIG. 4, each of the first type operation apparatuses A may include a first signal transmission terminal 1 toward the first direction and a third signal transmission terminal 3 toward the second and third directions. Further, each of the second type operation apparatuses B may include a fourth signal transmission terminal 4 toward the first direction and a second signal transmission terminal 2 toward the second and fourth directions.

The first signal transmission terminal 1 of the first type operation apparatus A and the second signal transmission terminal 2 of the second type operation apparatus B may be coupled with each other through a first signal transmission line L12. Further, the fourth signal transmission terminal 4 of the second type operation apparatus B and the third signal transmission terminal 3 of the first type operation apparatus A may be coupled with each other through a second signal transmission line L43. Moreover, the third signal transmission terminal 3 of the first type operation apparatus A and the second signal transmission terminal 2 of the second type operation apparatus B may be coupled with each other through a third signal transmission line L23.

The first to sixteenth operation apparatuses 10 to 160 include first to sixteenth storage blocks 12, 22, 32, 42, 52, 62, 72, 82, 92, 102, 112, 122, 132, 142, 152 and 162 and first to sixteenth identification blocks 14, 24, 34, 44, 54, 64, 74, 84, 94, 104, 114, 124, 134, 144, 154 and 164, respectively. Each of the first to sixteenth storage blocks 12, 22, 32, 42, 52, 62, 72, 82, 92, 102, 112, 122, 132, 142, 152 and 162 may be the same as one another. Each of the first to sixteenth identification blocks 14, 24, 34, 44, 54, 64, 74, 84, 94, 104, 114, 124, 134, 144, 154 and 164 may be the same as one another.

In accordance with an exemplary embodiment of the present invention, each of the first to sixteenth storage blocks 12, 22, 32, 42, 52, 62, 72, 82, 92, 102, 112, 122, 132, 142, 152 and 162 may store the self-ID information and peer ID information for peer operation apparatuses of a corresponding one of the first to sixteenth operation apparatuses 10 to 160. For example, the first to sixteenth storage blocks 12 to 162 may store identification information {13, 4, 1, 2, 5}, {14 1, 2, 3, 6}, {15, 2, 3, 4, 7}, {16, 3, 4, 1, 8}, {1, 8, 5, 6, 9}, {2, 5, 6, 7, 10}, {3, 6, 7, 8, 11}, {4, 7, 8, 5, 12}, {5, 12, 9, 10, 13}, {6, 9, 10, 11, 14}, {7, 10, 11, 12, 15}, {8, 11, 12, 9, 16}, {9, 16, 13, 14, 1}, {10, 13, 14, 15, 2}, {11, 14, 15, 16, 3} and {12, 15, 16, 13, 4} for 4 peer operation apparatuses respectively disposed in the first to fourth directions adjacent to the corresponding operation apparatuses 10 to 160.

For example, in the first operation apparatus 10, the first storage block 12 of the first operation apparatus 10 may store the identification information {13, 4, 1, 2, 5}, that is, the peer ID information {2} for the second operation apparatus 20 disposed adjacent to the first operation apparatus 10 in the first direction, the peer ID information {4} for the fourth operation apparatus 40 disposed adjacent to the first operation apparatus 10 in the second direction, the peer ID information {13} for the thirteenth operation apparatus 130 disposed adjacent to the first operation apparatus 10 in the third direction and the peer ID information {5} for identifying the fifth operation device 50 disposed adjacent to the first operation apparatus 10 in the fourth direction along with the self-ID information {1} for the first operation apparatus 10 itself.

Similarly, in the tenth operation apparatus 100, the tenth storage block 102 of the tenth operation apparatus 100 may store the identification information {6, 9, 10, 11, 14}, that is, the peer ID information {11} for the eleventh operation apparatus 110 disposed adjacent to the tenth operation apparatus 100 in the first direction, the peer ID information {9} for the ninth operation device 90 disposed adjacent to the tenth operation apparatus 100 in the second direction, the peer ID information {6} for the sixth operation device 60 disposed adjacent to the tenth operation apparatus 100 in the third direction and the peer ID information {14} for the fourteenth operation apparatus 140 disposed adjacent to the tenth operation apparatus 100 in the fourth direction along with the self-ID information {10} for the tenth operation apparatus 100 itself.

For reference, although no operation apparatuses are disposed in the second direction and the third direction from the first operation apparatus 10, the identification information {13, 4, 1, 2, 5} may be stored on the assumption that the fourth operation apparatus 40 and the thirteenth operation apparatus 130 are disposed in the second direction and the third direction. This is to allow all the first to sixteenth operation apparatuses 10 to 160 to identify the operation apparatuses positioned in the first to fourth directions by using the same algorithm. Similarly, the sixteenth operation apparatus 160 may store the identification information {12, 15, 16, 13, 4} on the assumption that the thirteenth operation apparatus 130 and the fourth operation apparatus 40 are disposed in the first direction and the fourth direction.

During an identification operation period, the first to sixteenth identification blocks 14 to 164 may check whether the first to sixteenth operation apparatuses 10 to 160 are disposed in the preset pattern, by using the identification information {13 4, 1, 2, 5}, {14, 1, 2, 6}, {15, 2, 4, 7}, . . . , {11, 14, 15, 16, 3} and {12, 15, 16, 13, 4} stored in the storage blocks 12 to 162 of the corresponding operation apparatuses 10 to 160, respectively.

For example, the identification operation period may start after a power-up of the operation apparatus module.

Figure 5:
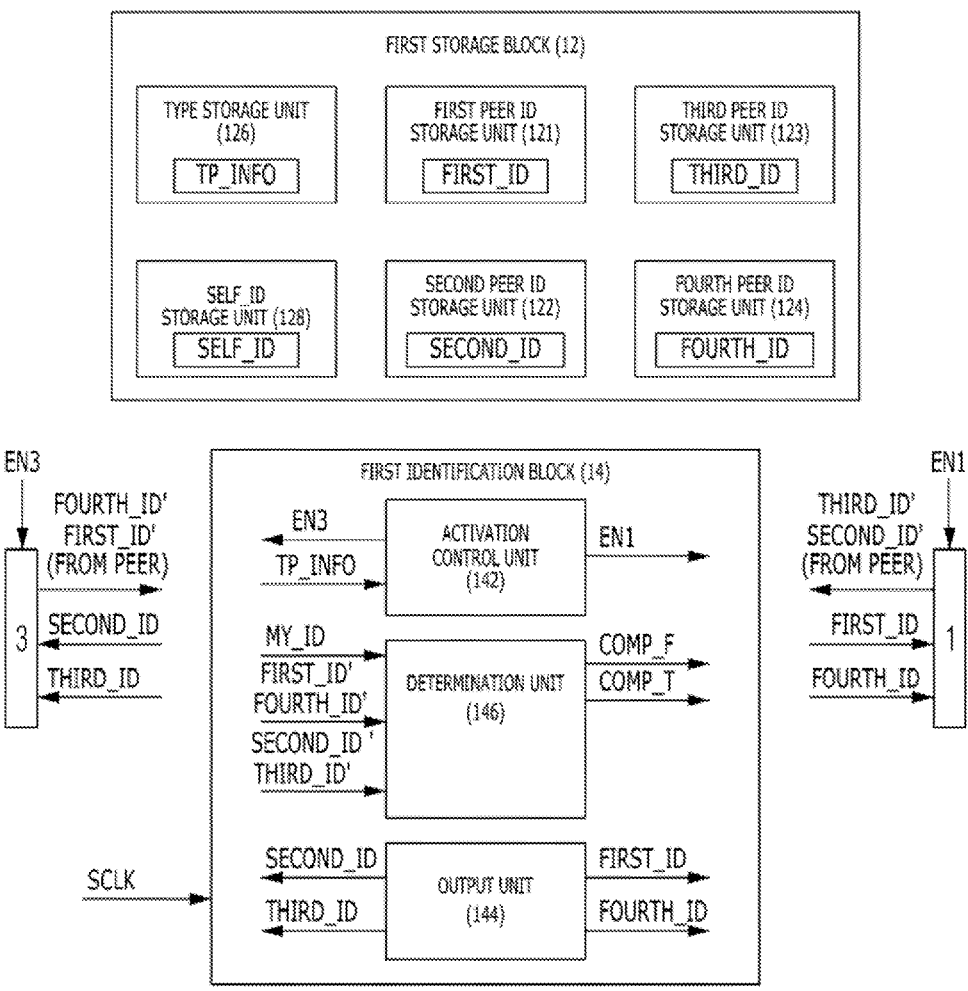
FIG. 5 is a block diagram illustrating a first operation device in an operation apparatus module shown in FIG. 4.

FIG. 5 is a block diagram illustrating the first operation device 10 in the operation apparatus module shown in FIG. 4.

Referring to FIG. 5, the first storage block 12 of the first operation apparatus 10 may include a type storage unit 126, a self-ID storage unit 128, a first peer ID storage unit 121, a second peer ID storage unit 122, a third peer ID storage unit 123, and a fourth peer ID storage unit 124. Also, the first identification block 14 of the first operation apparatus 10 may include an activation control unit 142, an output unit 144, and a determination unit 146.

FIG. 5 exemplarily shows the first operation apparatus 10, which is the same as the second to sixteenth operation apparatuses 20 to 160.

Thus, the second storage block 22 of the second operation apparatus 20 may include a type storage unit 226, a self-ID storage unit 228, a first peer ID storage unit 221, a second peer ID storage unit 222, a third peer ID storage unit 223, and a fourth peer ID storage unit 224. Also, the second identification block 24 of the second operation apparatus 20 may include an activation control unit 242, an output unit 244, and a determination unit 246.

In the same manner, the third to sixteenth storage blocks 32 to 162 of the third to sixteenth operation apparatuses 30 to 160 may include type storage units 326 to 1626, self-ID storage units 328 to 1628, first peer ID storage units 321 to 1621, second peer ID storage units 322 to 1622, third peer ID storage units 323 to 1623, and fourth peer ID storage units 324 to 1624, respectively. Also, the third to sixteenth identification blocks 34 to 164 of the third to sixteenth operation apparatuses 30 to 160 may include activation control units 342 to 1642, output units 344 to 1644, and determination units 346 to 1646.

The type storage unit 126 may store type information TP_INFO representing the type of the corresponding operation apparatus 10 between the first type operation apparatus A and the second type operation apparatus B. For example, when the first operation apparatus 10 is the first type operation apparatus A, the type information TP_INFO stored in the type storage unit 126 of the first operation apparatus 10 may have a value that represents 'A'. Similarly, the type information TP_INFO stored in the type storage unit 226 of the second operation apparatus 20 which is classified as the second type operation apparatus B may have a value that represents 'B'.

The self-ID storage unit 128 may store self-ID information SELF_ID for identifying the corresponding operation apparatus 10. Namely, when the identification information for the first operation apparatus 10 has the value of '{1}', '{1}' may be stored as the self-ID information SELF_ID in the self-ID storage unit 128 of the first operation apparatus 10. Similarly, when identification information for identifying the second operation apparatus 20 has the value of '{2}', '{2}' may be stored as the self-ID information SELF_ID in the self-ID storage unit 228 of the second operation apparatus 20.

The first peer ID storage unit 121 may store first peer ID information FIRST_ID for a first peer operation apparatus disposed in the first direction of the corresponding operation apparatus 10. That is to say, since the second operation apparatus 20 is disposed in the first direction of the first operation apparatus 10, the value of '{2}' as identification information representing the second operation apparatus 20 may be stored in the first peer ID storage unit 121 of the first operation apparatus 10. Similarly, since the third operation apparatus 30 is disposed in the first direction of the second operation apparatus 20, the value of {3} as identification information representing the third operation apparatus 30 may be stored in the first peer ID storage unit 221 of the second operation apparatus 20.

The second peer ID storage unit 122 may store second peer ID information SECOND_ID for second peer operation apparatus disposed in the second direction of the corresponding operation apparatus 10. That is to say, since the fourth operation apparatus 40 is disposed in the second direction of the first operation apparatus 10, the value of '{4}' as identification information representing the fourth operation apparatus 40 may be stored in the second peer ID storage unit 122 of the first operation apparatus 10. Similarly, since the first operation apparatus 10 is disposed in the second direction of the second operation apparatus 20 the value of '{1}' as identification information representing the first operation apparatus 10 may be stored in the second peer ID storage unit 222 of the second operation apparatus 20.

The third peer ID storage unit 123 may store third peer ID information. THIRD_ID for a third peer operation apparatus disposed in the third direction from the corresponding operation apparatus 10. That is to say, since the thirteenth operation apparatus 130 is disposed in the third direction of the first operation apparatus 10, the value of '{13}' representing the thirteenth operation apparatus 130 may be stored as the third peer ID information THIRD_ID in the third peer ID storage unit 123 of the first operation apparatus 10. Similarly, since the fourteenth operation apparatus 140 is disposed in the third direction of the second operation apparatus 20, the value of '{14}' representing the fourteenth operation apparatus 140 may be stored as the third peer ID information THIRD_ID in the third peer ID storage unit 223 of the second operation apparatus 20.

The fourth peer ID storage unit 124 may store fourth peer ID information FOURTH_ID for a fourth peer operation apparatus disposed in the fourth direction of the corresponding operation apparatus 10. That is to say, since the fifth operation device 50 is disposed in the fourth direction of the first operation apparatus 10, the value of '{5}' representing the fifth operation device 50 may be stored as the fourth peer ID information FOURTH_ID in the fourth peer ID storage unit 124 of the first operation apparatus 10. Similarly, since the sixth operation device 60 is disposed in the fourth direction of the second operation apparatus 20, the value of '{6}' representing the sixth operation device 60 may be stored as the fourth peer ID information FOURTH_ID in the fourth peer ID storage unit 224 of the second operation apparatus 20.

The activation control unit 142 may activate one and deactivate the others among the group of the first and second signal transmission terminals 1 and 2, the group of the second and third signal transmission terminals 2 and 3, the group of the third and fourth signal transmission terminals 3 and 4 and the group of the fourth and first signal transmission terminals 4 and 1 during the identification operation period. In other words, when the first and second signal transmission terminals 1 and 2 are activated, the third and fourth signal transmission terminals 3 and 4 are deactivated. When the second and third signal transmission terminals 2 and 3 are activated, the first and fourth signal transmission terminals 1 and 4 are deactivated. When the third and fourth signal transmission terminals 3 and 4 are activated, the first and second signal transmission terminals 1 and 2 are deactivated. When the first and fourth signal transmission terminals 1 and 4 are activated, the second and third signal transmission terminals 2 and 3 are deactivated.

As described above, the first and third signal transmission terminals 1 and 3 may be included in each of the first and third operation apparatuses 10 and 30 which are classified as the first type operation apparatuses A. Also, the second and fourth signal transmission terminals 2 and 4 may be included in each of the second and fourth operation apparatuses 20 and 40 which are classified as the second type operation apparatuses B.

Accordingly, the activation control unit 142 of the first operation apparatus 10 classified as the first type operation apparatus A may operate in such a way as to deactivate the third signal transmission terminal 3 during activation of the first signal transmission terminal 1 and to activate the third signal transmission terminal 3 during deactivation of the first signal transmission terminal 1. To this end, the activation control unit 142 of the first operation apparatus 10 may generate a first enable signal EN1 to activate the first signal transmission terminal 1 and a third enable signal EN3 to activate the third signal transmission terminal 3.

Similarly, the activation control unit 242 of the second operation apparatus 20 classified as the second type operation apparatus B may operate in such a way as to deactivate the fourth signal transmission terminal 4 during activation of the second signal transmission terminal 2 and to activate the fourth signal transmission terminal 4 during deactivation of the second signal transmission terminal 2. To this end, the activation control unit 242 of the second operation apparatus 20 may generate a second enable signal EN2 to activate the second signal transmission terminal 2 and a fourth enable signal EN4 to activate the fourth signal transmission terminal 4.

In detail, during the identification operation period, the activation control unit 142 may activate one and deactivate the other one among the group of the first and second signal transmission terminals 1 and 2, the group of the second and third transmission terminals 2 and 3, the group of the third and fourth signal transmission terminals 3 and 4 and the group of the fourth and first signal transmission terminals 4 and 1 according to the value stored in the type storage unit 126.

For example, during the identification operation period, the activation control unit 142 of the first operation apparatus 10 may activate the first signal transmission terminal 1 according to the value stored in the type storage unit 126.

Similarly, during the identification operation period, the activation control unit 242 of the second operation apparatus 20 may activate the second signal transmission terminal 2 according to the value stored in the type storage unit 126.

Further, the activation control unit 142 may deactivate one and activate the others among the group of the first and second signal transmission terminals 1 and 2, the group of the second and third transmission terminals 2 and 3, the group of the third and fourth signal transmission terminals 3 and 4 and the group of the fourth and first signal transmission terminals 4 and 1 a preset number of toggles of a source clock SCLK after the start of the identification operation period.

For example, in the first operation apparatus 10, which is the first type operation apparatus A, the activation control unit 142 of the first operation apparatus 10 may perform a first switch operation of activating the first signal transmission terminal 1 and deactivating the third signal transmission terminal 3 during the preset number of toggles of the source clock SCLK at start of the identification operation period, and then perform a second switch operation of deactivating the first signal transmission terminal 1 and activating the third signal transmission terminal 3 the preset number of toggles of the source clock SCLK after the start of the identification operation period.

Similarly, in the second operation apparatus 20, which is the second type operation apparatus B, the activation control unit 242 of the second operation apparatus 20 may perform a third switch operation of activating the second signal transmission terminal 2 and deactivating the fourth signal transmission terminal 4 during the preset number of toggles of the source clock SCLK at the start of the identification operation period, and then perform a fourth switch operation of deactivating the second signal transmission terminal 2 and activating the fourth signal transmission terminal 4 the preset number of toggles of the source clock SCLK after the start of the identification operation period.

For example, a first half of the first switch operation may overlap a first half of the third switch operation during a first overlap period. A second half of the third switch operation may overlap a first half of the second switch operation during a second overlap period. A second half of the second switch operation may overlap a first half of the fourth switch operation during a third overlap period, A second half of the fourth switch operation may overlap a second half of the first switch operation during a fourth overlap period.

The output unit 144 may output one of the first peer ID information FIRST_ID stored in the first peer ID storage unit 121 of the corresponding operation apparatus 10, the second peer ID information SECOND_ID stored in the second peer ID storage unit 122 of the corresponding operation apparatus 10, the third peer ID information THIRD_ID stored in the third peer ID storage unit 123 of the corresponding operation apparatus 10 and the fourth peer ID information FOURTH_ID stored in the fourth peer ID storage unit 124 of the corresponding operation apparatus 10, to a peer operation apparatus of the corresponding operation apparatus 10, according to the operation of the activation control unit 142 during the identification operation period.

In detail, when the corresponding operation apparatus 10 is the first type operation apparatus A, the output unit 144 may operate as follows.

During the first overlap period, the first peer ID information FIRST_ID stored in the first peer ID storage unit 121 of the corresponding operation apparatus 10 may be outputted through the first signal transmission terminal 1 in the first direction by the first switch operation.

During the second overlap period, the value stored in the third peer ID storage unit 123 of the corresponding operation apparatus 10 may be outputted through the third signal transmission terminal 3 in the third direction by the second switch operation.

During the third overlap period, the value stored in the second peer ID storage unit 122 of the corresponding operation apparatus 10 may be outputted through the third signal transmission terminal 3 in the second direction by the second switch operation.

During the fourth overlap period, the fourth peer ID information FOURTH_ID stored in the fourth peer ID storage unit 124 of the corresponding operation apparatus 10 may be outputted through the first signal transmission terminal 1 toward the first direction by the first switch operation. Also, the peer ID information inputted in the fourth direction to the third signal transmission terminal 3 of the corresponding operation apparatus 10 may be bypassed in the second direction, and the peer ID information inputted in the first direction to the third signal transmission terminal 3 of the corresponding operation apparatus 10 may be bypassed in the third direction, by the first switch operation.

When the corresponding operation apparatus 20 is the second type operation apparatus B, the output unit 244 may operate as follows.

During the first overlap period, the second peer ID information SECOND_ID stored in the second peer ID storage unit 222 of the corresponding operation apparatus 20 may be outputted through the second signal transmission terminal 2 in the second direction by the third switch operation.

During the second overlap period, the value stored in the fourth peer ID storage unit 224 of the corresponding operation apparatus 20 may be outputted through the second signal transmission terminal 2 in the fourth direction by the third switch operation.

During the third overlap period, the value stored in the first peer ID storage unit 221 of the corresponding operation apparatus 20 may be outputted through the fourth signal transmission terminal 4 in the first direction by the third switch operation.

During the fourth overlap period, the value stored in the third peer ID storage unit 223 of the corresponding operation apparatus 20 may be outputted through the fourth signal transmission terminal 4 in the first direction by the fourth switch operation. Also, the value inputted in the first direction to the second signal transmission terminal 2 may be bypassed in the fourth direction and the value inputted in the third direction to the second signal transmission terminal 2 may be bypassed in the second direction, by the fourth switch operation.

For example, during the first overlap period when the first and second signal transmission terminals 1 and 2 are activated by the first and third switch operations of the first and second operation apparatuses 10 and 20, the value {2} of the first peer ID information FIRST_ID stored in the first peer ID storage unit 121 of the first operation apparatus 10 may be outputted from the first signal transmission terminal 1 of the first operation apparatus 10 to the second signal transmission terminal 2 of the second operation apparatus 20 which is disposed in the first direction of the first operation apparatus 10.

Also, during the first overlap period, the value '{1}' of the second peer ID information SECOND_ID stored in the second peer ID storage unit 222 of the second operation apparatus 20 may be outputted from the second signal transmission terminal 2 of the second operation apparatus 20 to the first signal transmission terminal 1 of the first operation apparatus 10 which is disposed in the second direction of the second operation apparatus 20.

During the second overlap period when the second and third signal transmission terminals 2 and 3 are activated by the second and third switch operations of the first and thirteenth operation apparatuses 10 and 130, the value '{13}' of the third peer ID information THIRD_ID stored in the third peer ID storage unit 123 of the first operation apparatus 10 may be outputted from the third signal transmission terminal 3 of first operation apparatus 10 to the second signal transmission terminal 2 of the thirteenth operation apparatus 130 which is disposed in the third direction of the first operation apparatus 10.

Also, during the second overlap period when the second and third signal transmission terminals 2 and 3 are activated by the second and third switch operations of the second and sixth operation apparatuses 20 and 60, the value '{6}' of the fourth peer ID information FOURTH_ID stored in the fourth peer ID storage unit 224 of the second operation apparatus 20 may be outputted from the second signal transmission terminal 2 of the second operation apparatus 20 to the third signal transmission terminal 3 of the sixth operation device 60 which is disposed in the fourth direction from the second operation apparatus 20.

During the third overlap period when the third and fourth signal transmission terminals 3 and 4 are activated by the second and fourth switch operations of the first and fourth operation apparatuses 10 and 40, the value '{4}' of the second peer ID information SECOND_ID stored in the second peer ID storage unit 122 of the first operation apparatus 10 may be outputted from the third signal transmission terminal 3 of the first operation apparatus 10 to the fourth signal transmission terminal 4 of the fourth operation apparatus 40 which is disposed in the second direction of the first operation apparatus 10.

Also, during the third overlap period when the third and fourth signal transmission terminals 3 and 4 are activated by the second and fourth switch operations the second and third operation apparatuses 20 and 30, the value '{3}' of the first peer ID information FIRST_ID stored in the first peer ID storage unit 221 of the second operation apparatus 20 may be outputted from the fourth signal transmission terminal 4 of the second operation apparatus 20 to the third signal transmission terminal 3 of the third operation apparatus 30 which is disposed in the first direction of the second operation apparatus 20.

During the fourth overlap period when the first and fourth signal transmission terminals 1 and 4 are activated by the first and fourth switch operations of the first and sixth operation apparatuses 10 and 60 and the second and fifth operation apparatuses 20 and 50, the value '{5}' of the fourth peer ID information FOURTH_ID stored in the fourth peer ID storage unit 124 of the first operation apparatus 10 may be outputted from the first signal transmission terminal 1 of the first operation apparatus 10 to the second signal transmission terminal 2 of the second operation apparatus 20 which is disposed in the first direction of the first operation apparatus 10. The second operation apparatus 20 may bypass the value '{5}' of the fourth peer ID information FOURTH_ID, which is inputted to the second signal transmission terminal 2 from the first operation apparatus 10 to the third signal transmission terminal 3 of the sixth operation device 60 which is disposed in the fourth direction of the second operation apparatus 20. The sixth operation device 60 may bypass the value '{5}' of the fourth peer ID information FOURTH_ID which is inputted to the third signal transmission terminal 3 from the second operation apparatus 20, to the fourth signal transmission terminal 4 of the fifth operation apparatus 50 in the second direction of the sixth operation device 60. Therefore, the value '{5}' of the fourth peer ID information FOURTH_ID stored in the fourth peer ID storage unit 124 of the first operation apparatus 10 may be inputted to the fourth signal transmission terminal 4 of the fifth operation device 50.

Also, during the fourth overlap period when the first and fourth signal transmission terminals 1 and 4 are activated by the first and fourth switch operations of the third and fourteenth operation apparatuses 30 and 140 and the second and fifteenth operation apparatus 20 and 150, the value '{14}' of the third peer ID information THIRD_ID stored in the third peer ID storage unit 223 of the second operation apparatus 20 may be outputted from the fourth signal transmission terminal 4 to the third signal transmission terminal 3 of the third operation apparatus 30 which is disposed in the first direction of the second operation apparatus 20. The third operation apparatus 30 may bypass the value '{14}' of the third peer ID information THIRD_ID, which is inputted to the third signal transmission terminal 3 from the second operation apparatus 20, to the second signal transmission terminal 2 of the fifteenth operation apparatus 150 which is disposed in the third direction of the third operation apparatus 30. The fifteen operation apparatus 150 may bypass the value '{14}' of the third peer ID information THIRD_ID, which is inputted to the second signal transmission terminal 2 from the third operation apparatus 30, to the first signal transmission terminal 1 of the fourteenth operation apparatus 140 in the second direction of the fifteen operation apparatus 150. Therefore, the value '{14}' of the third peer ID information THIRD_ID stored in the third peer ID storage unit 223 of the second operation apparatus 20 may be inputted to the first signal transmission terminal 1 of the fourteenth operation apparatus 140.

The determination unit 146 may compare one of the first or second peer ID information SECOND_ID' and FIRST_TD' inputted from the peer operation apparatuses of the corresponding operation apparatus 10 through the first and third signal transmission terminals 1 and 3 activated in response to the first and third enable signals EN1 and EN3 and the self-ID information SELF_ID stored in the self-ID storage unit 128, and may determine whether they correspond to each other during the identification operation period.

In detail, when the corresponding operation apparatus 10 is the first type operation apparatus A, the determination unit 146 may operate as follows.

The determination unit 146 may perform a first determination operation during the first switch operation of the first overlap period, wherein the determination unit 146 may compare the second peer ID information SECOND_ID' inputted from the second operation apparatus 20 through the first signal transmission terminal 1 activated by the first switch operation of the activation control unit 142 of the first operation apparatus 10 with the self-ID information SELF_ID stored in the self-ID storage unit 128 of the first operation apparatus 10, and may determine whether the second peer ID information SECOND_ID' is substantially the same as the self-ID information SELF_ID.

In a normal situation where the second operation apparatus 20 is disposed in the first direction of the first operation apparatus 10, the second peer ID information SECOND_ID' inputted through the first signal transmission terminal 1 of the first operation apparatus 10 may have the value '{1}' of the second peer ID information SECOND_ID stored in the third peer ID storage unit 223 of the second operation apparatus 20. Accordingly, when the second peer ID information SECOND_ID' inputted through the first signal transmission terminal 1 of the first operation apparatus 10 is compared with the value '{1}' of the self-ID information SELF_ID stored in the self-ID storage unit 128 of the first operation apparatus 10 during the first determination operation, they may be substantially the same as each other, and a result of the first determination operation may be successful.

Conversely, in an abnormal situation where not the second operation apparatus 20 but the third operation apparatus 30 is disposed in the first direction of the first operation apparatus 10, the second peer ID information SECOND_ID' inputted through the first signal transmission terminal 1 of the first operation apparatus 10 may have the value '{2}' of the second peer ID information SECOND_ID stored in the second peer ID storage unit 322 of the third operation apparatus 30. Accordingly, when the second peer ID information SECOND_ID' inputted through the first signal transmission terminal 1 of the first operation apparatus 10 is compared with the value '{1}' of the self-ID information SELF_ID stored in the self-ID storage unit 128 of the first operation apparatus 10 during the first determination operation, they may not be substantially the same as each other, and a result of the first determination operation may fail.

Similarly, the determination unit 146 may perform a second determination operation during the second switch operation of the second overlap period, wherein the determination unit 146 may compare the first peer ID information FIRST_ID' inputted from the thirteenth operation apparatus 130 through the third signal transmission terminal 3 activated by the second switch operation of the activation control unit 142 of the first operation apparatus 10 with the self-ID information SELF_ID stored in the self-ID storage unit 128 of the first operation apparatus 10, and may determine whether the first peer ID information FIRST_ID' is substantially the same as the self-ID information SELF_ID.

In a normal situation where the thirteenth operation apparatus 130 is disposed in the third direction of the first operation apparatus 10, the fourth peer ID information FOURTH_ID' inputted through the third signal transmission terminal 3 of the first operation apparatus 10 may have the value '{1}' of the fourth peer ID information FOURTH_ID stored in the fourth peer ID storage unit 1324 of the thirteenth operation apparatus 130. Accordingly, when the fourth peer ID information FOURTH_ID' inputted through the third signal transmission terminal 3 of the first operation apparatus 10 is compared with the value '{1}' of the self-ID information SELF_ID stored in the self-ID storage unit 128 of the first operation apparatus during the second determination operation, they may be substantially the same as each other, and a result of the second determination operation may be successful.

Conversely, in an abnormal situation where not the thirteenth operation apparatus 130 but the fourteenth operation apparatus 140 is disposed in the third direction of the first operation apparatus 10, the fourth peer ID information FOURTH_ID' inputted through the third signal transmission terminal 3 of the first operation apparatus 10 may have the value '{2}' of the fourth peer ID information FOURTH_ID stored in the fourth peer ID storage unit 1423 of the fourteenth operation apparatus 140. Accordingly, when the fourth peer ID information FOURTH_ID' inputted through the third signal transmission terminal 3 of the first operation apparatus 10 is compared with the value '{1}' of the self-ID information SELF_ID stored in the self-ID storage unit 128 of the first operation apparatus 10 during the second determination operation, they may not be substantially the same as each other and a result of the second determination operation may fail.

Similarly, the determination unit 146 may perform a third determination operation during the second switch operation of the third overlap period, wherein the determination unit 146 may compare the first peer ID information FIRST_ID/ inputted from the fourth operation apparatus 40 through the third signal transmission terminal 3 activated by the second switch operation of the activation control unit 142 of the first operation apparatus 10 with the self-ID information SELF_ID stored in the self-ID storage unit 128 of the first operation apparatus 10 and may determine whether the first peer ID information FIRST_ID' is substantially the same as the self-ID information SELF_ID.

In a normal situation where the fourth operation apparatus 40 is disposed in the second direction of the first operation apparatus 10, the first peer ID information FIRST_ID' inputted through the third signal transmission terminal 3 of the first operation apparatus 10 may have the value '{1}' of the first peer ID information FIRST_ID stored in the first peer ID storage unit 421 of the fourth operation apparatus 40. Accordingly, when the first peer ID Information FIRST_ID' inputted through the third signal transmission terminal 3 of the first operation apparatus 10 is compared with the value '{1}' of the self-ID information SELF_ID stored in the self-ID storage unit 128 of the first operation apparatus 10 during the third determination operation, they may be substantially the same as each other, and a result of the third determination operation may be successful.

Conversely, in an abnormal situation where not the fourth operation apparatus 40 but the third operation apparatus 30 is disposed in the second direction of the first operation apparatus 10, the first peer ID information FIRST_ID' inputted through the third signal transmission terminal 3 of the first operation apparatus 10 may have the value '{4}' of the first peer ID information FIRST_ID stored in the first peer ID storage unit 321 of the third operation apparatus 30. Accordingly, when the first peer ID information FIRST_ID' inputted through the third signal transmission terminal 3 of the first operation apparatus 10 is compared with the value '{1}' of the self-ID information SELF_ID stored in the self-ID storage unit 128 of the first operation apparatus 10 during the third determination operation, they may not be substantially the same as each other, and a result of the third determination operation may fail.

Similarly, the determination unit 146 may perform a fourth determination operation during the first switch operation of the fourth overlap period, wherein the determination unit 146 may compare the second peer ID information SECOND_ID' inputted from the fifth operation apparatus 50 through the first signal transmission terminal 1 activated by the first switch operation of the activation control unit 142 of the first operation apparatus 10 with the self-ID information SELF_ID stored in the self-ID storage unit 128 of the first operation apparatus 10, and may determine whether the second peer ID information SECOND_ID' is substantially the same as the self-ID information SELF_ID.

In a normal situation where the fifth operation apparatus 50 is disposed in the fourth direction of the first operation apparatus 10, the third peer ID information THIRD_ID' inputted through the first signal transmission terminal 1 of the first operation apparatus 10 may have the value '{1}' of the third peer ID information THIRD_ID stored in the third peer ID storage unit 523 of the fifth operation apparatus 50. Accordingly, when the third peer ID information THIRD_ID' inputted through the first signal transmission terminal 1 of the first operation apparatus 10 is compared with the value '{1}' of the self-ID information SELF_ID stored in the self-ID storage unit 128 of the first operation apparatus 10 during the fourth determination operation, they may be substantially the same as each other, and a result of the fourth determination operation may be successful.

Conversely in an abnormal situation where not the fifth operation apparatus 50 but the sixth operation apparatus 60 is disposed in the fourth direction of the first operation apparatus 10, the third peer ID information THIRD_ID' inputted through the first signal transmission terminal 1 of the first operation apparatus 10 may have the value '{2}' of the third peer ID information THIRD_ID stored in the third peer ID storage unit 623 of the sixth operation apparatus 60. Accordingly, when the third peer ID information THIRD_ID' inputted through the first signal transmission terminal 1 of the first operation apparatus 10 is compared with the value '{1}' of the self-ID information SELF_ID stored in the self-ID storage unit 128 of the first operation apparatus 10 during the fourth determination operation, they may not be substantially the same as each other, and a result of the fourth determination operation may fail.

When all of the first to fourth determination operations are successful, the corresponding operation apparatus 10 as the first type operation apparatus A may end the identification operation period.

In such way, only when the second, thirteenth, fourth and fifth operation apparatuses 20, 130, 40 and 50 are respectively disposed in the first to fourth directions of the first operation apparatus 10, all of the first to fourth determination operations may be successful, and the first operation apparatus 10 may end the identification operation period. If even one of the first to fourth determination operations fails, the first operation apparatus 10 may not end the identification operation period, which may not allow the operation apparatus module to perform further process and thus prevent reuse of the operation apparatus module.

When the corresponding operation apparatus 20 is the second type operation apparatus B, the determination unit 246 may operate as follows.

The determination unit 246 may perform a fifth determination operation during the third switch operation of the first overlap period, wherein the determination unit 246 may compare the first peer ID information FIRST_ID' inputted from the first operation apparatus 10 through the second signal transmission terminal 2 activated by the third switch operation of the activation control unit 242 of the second operation apparatus 20 with the self-ID information SELF_ID stored in the self-ID storage unit 228 of the second operation apparatus 20, and may determine whether the first peer ID information FIRST_ID' is substantially the same as the self-ID information SELF_ID.

In a normal situation where the first operation apparatus 10 is disposed in the second direction of the second operation apparatus 20, the first peer ID information FIRST_ID' inputted through the second signal transmission terminal 2 of the second operation apparatus 20 may have the value '{2}' of the first peer ID information FIRST_ID stored in the first peer ID storage unit 121 of the first operation apparatus 10. Accordingly, when the first peer ID information FIRST_ID' inputted through the second signal transmission terminal 2 of the second operation apparatus 20 is compared with the value '{2}' of the self-ID information. SELF_ID stored in the self-ID storage unit 228 of the second operation apparatus 20 during the fifth determination operation, they may be substantially the same as each other, and a result of the fifth determination operation may be successful.

Conversely, in an abnormal situation where not the first operation apparatus 10 but the fourth operation apparatus 40 is disposed in the second direction of the second operation apparatus 20, the first peer ID information FIRST_ID' inputted through the second signal transmission terminal 2 of the second operation apparatus 20 may have the value '{1}' of the first peer ID information FIRST_ID stored in the first peer ID storage unit 421 of the fourth operation apparatus 40. Accordingly, when the first peer ID information FIRST_ID' inputted through the second signal transmission terminal 2 of the second operation apparatus 20 is compared with the value '{2}' of the self-ID information SELF_ID stored in the self-ID storage unit 228 of the second operation apparatus 20 during the fifth determination operation, they may not be substantially the same as each other, and a result of the fifth determination operation may fail.

Similarly, the determination unit 246 may perform a sixth determination operation during the third switch operation of the second overlap period, wherein the determination unit 246 may compare the first peer ID information FIRST_ID' inputted from the sixth operation apparatus 60 through the second signal transmission terminal 2 activated by the third switch operation of the activation control unit 242 of the second operation apparatus 20 with the self-ID information SELF_ID stored in the self-ID storage unit 228 of the second operation apparatus 20, and may determine whether the first peer ID information FIRST_ID is substantially the same as the self-ID information SELF_ID.

In a normal situation where the sixth operation apparatus 60 is disposed in the fourth direction of the second operation apparatus 20, the third peer ID information THIRD_ID' inputted through the second signal transmission terminal 2 of the second operation apparatus 20 may have the value '{2}' of the third peer ID information THIRD_ID stored in the third peer ID storage unit 623 of the sixth operation apparatus 60. Accordingly, when the third peer ID information THIRD_ID' inputted through the second signal transmission terminal 2 of the second operation apparatus 20 is compared with the value '{2}' of the self-ID information SELF_ID stored in the self-ID storage unit 228 of the second operation apparatus 20 during the sixth determination operation, they may be substantially the same as each other, and a result of the sixth determination operation may be successful.

Conversely, in an abnormal situation where not the sixth operation apparatus 60 but the seventh operation apparatus 70 is disposed in the fourth direction of the second operation apparatus 20, the third peer ID information THIRD_ID inputted through the second signal transmission terminal 2 of the second operation apparatus 20 may have the value '{3}' of the third peer ID information THIRD_ID stored in the third peer ID storage unit 723 of the seventh operation apparatus 70. Accordingly, when the third peer ID information THIRD_ID' inputted through the second signal transmission terminal 2 of the second operation apparatus 20 is compared with the value '{2}' of the self-ID information SELF_ID stored in the self-ID storage unit 228 of the second operation apparatus 20 during the sixth determination operation, they may not be substantially the same as each other, and a result of the sixth determination operation may fail.

Similarly, the determination unit 246 may perform a seventh determination operation during the fourth switch operation of the third overlap period, wherein the determination unit 246 may compare the second peer ID information SECOND_ID' inputted from the third operation apparatus 30 through the fourth signal transmission terminal 4 activated by the fourth switch operation of the activation control unit 242 of the second operation apparatus 20 with the self-ID information SELF_ID stored in the self-ID storage unit 228 of the second operation apparatus 20, and may determine whether the first peer ID information FIRST_ID' is substantially the same as the self-ID information SELF_ID.

In a normal situation where the third operation apparatus 30 is disposed in the first direction of the second operation apparatus 20 the second peer ID information SECOND_ID inputted through the fourth signal transmission terminal 4 of the second operation apparatus 20 may have the value '{2}' of the second peer ID information SECOND_ID stored in the second peer ID storage unit 322 of the third operation apparatus 30. Accordingly, when the second peer ID information SECOND_ID' inputted through the fourth signal transmission terminal 4 of the second operation apparatus 20 is compared with the value '{2}' of the self-ID information. SELF_ID stored in the self-ID storage unit 228 of the second operation apparatus 20 during the seventh determination operation, they may be substantially the same as each other, and a result of the seventh determination operation may be successful.

Conversely, in an abnormal situation where not the third operation apparatus 30 but the fourth operation apparatus 40 is disposed in the first direction of the second operation apparatus 20, the second peer ID information SECOND_ID' inputted through the fourth signal transmission terminal 4 of the second operation apparatus 20 may have the value '{3}' of the second peer ID information SECOND_ID stored in the second peer ID storage unit 422 of the fourth operation apparatus 40. Accordingly, when the second peer ID information SECOND_ID' inputted through the fourth signal transmission terminal 4 of the second operation apparatus 20 is compared with the value '{2}' of the self-ID information. SELF_ID stored in the self-ID storage unit 228 of the second operation apparatus 20 during the seventh determination operation, they may not be substantially the same as each other, and a result of the seventh determination operation may fail.

Similarly, the determination unit 246 may perform an eighth determination operation during the fourth switch operation of the fourth overlap period, wherein the determination unit 246 may compare the second peer ID information SECOND_ID' inputted from the fourteenth operation apparatus 140 through the fourth signal transmission terminal 4 activated by the fourth switch operation of the activation control unit 242 of the second operation apparatus 20 with the self-ID information SELF_ID stored in the self-ID storage unit 228 of the second operation apparatus 20, and may determine whether the second peer ID information SECOND_ID' is substantially the same as the self-ID information SELF_ID.

In a normal situation where the fourteenth operation apparatus 140 is disposed in the third direction of the second operation apparatus 20, the fourth peer ID information FOURTH_ID' inputted through the fourth signal transmission terminal 4 of the second operation apparatus 20 may have the value '{2}' of the fourth peer ID information FOURTH_ID stored in the fourth peer ID storage unit 1424 of the fourteenth operation apparatus 140. Accordingly, when the fourth peer ID information FOURTH_ID' inputted through the fourth signal transmission terminal 4 of the second operation apparatus 20 is compared with the value '{2}' of the self-ID information SELF_ID stored i'n the self-ID storage unit 228 of the second operation apparatus 20 during the eighth determination operation, they may be substantially the same as each other, and a result of the eighth determination operation may be successful.

Conversely, in an abnormal situation where not the fourteenth operation apparatus 140 but the fifteenth operation apparatus 150 is disposed in the third direction of the second operation apparatus 20, the fourth peer ID information FOURTH_ID' inputted through the fourth signal transmission terminal 4 of the second operation apparatus 20 may have the value '{3}' of the fourth peer ID information FOURTH_ID stored in the fourth peer ID storage unit 1523 of the fifteenth operation apparatus 150. Accordingly, when the fourth peer ID information FOURTH_ID' inputted through the fourth signal transmission terminal 4 of the second operation apparatus 20 is compared with the value '{2}' of the self-ID information SELF_ID stored in the self-ID storage unit 228 of the second operation apparatus 20 during the eighth determination operation, they may not be substantially the same as each other, and a result of the eighth determination operation may fail.

When all of the fifth to eighth determination operations are successful, the corresponding operation apparatus 20 as the second type operation apparatus S may end the identification operation period.

In such way, only when the third, first, fourteenth and sixth operation apparatuses 30, 10, 140 and 30 are respectively disposed in the first to fourth directions of the second operation apparatus 20, all of the fifth to eighth determination operations may be successful, and the second operation apparatus 20 may end the identification operation period. If even one of the fifth to eighth determination operations fails, the second operation apparatus 20 may not end the identification operation period, which may not allow the operation apparatus module to perform further process and thus prevent reuse of the operation apparatus module.

The end of the identification operation period due to the success of the first to fourth determination operations for the first type operation apparatus A and the fifth to eighth determination operations for the second type operation apparatus B may affect the next operation of the operation apparatus module after the end of the identification operation period. For example, when the operation apparatus module is supposed to start the identification operation period at the power-up of the operation apparatus module and to perform the next operation after the end of the identification operation period, the operation apparatus module may perform the next operation only when both the first type operation apparatus A and the second type operation apparatus B are precisely disposed at predetermined positions. Otherwise, the identification operation period may not end and the next operation may not be performed.

FIGS. 6A to 6D are timing diagrams illustrating an operation of an operation apparatus module shown in FIGS. 4 and 5.

Figure 6A:
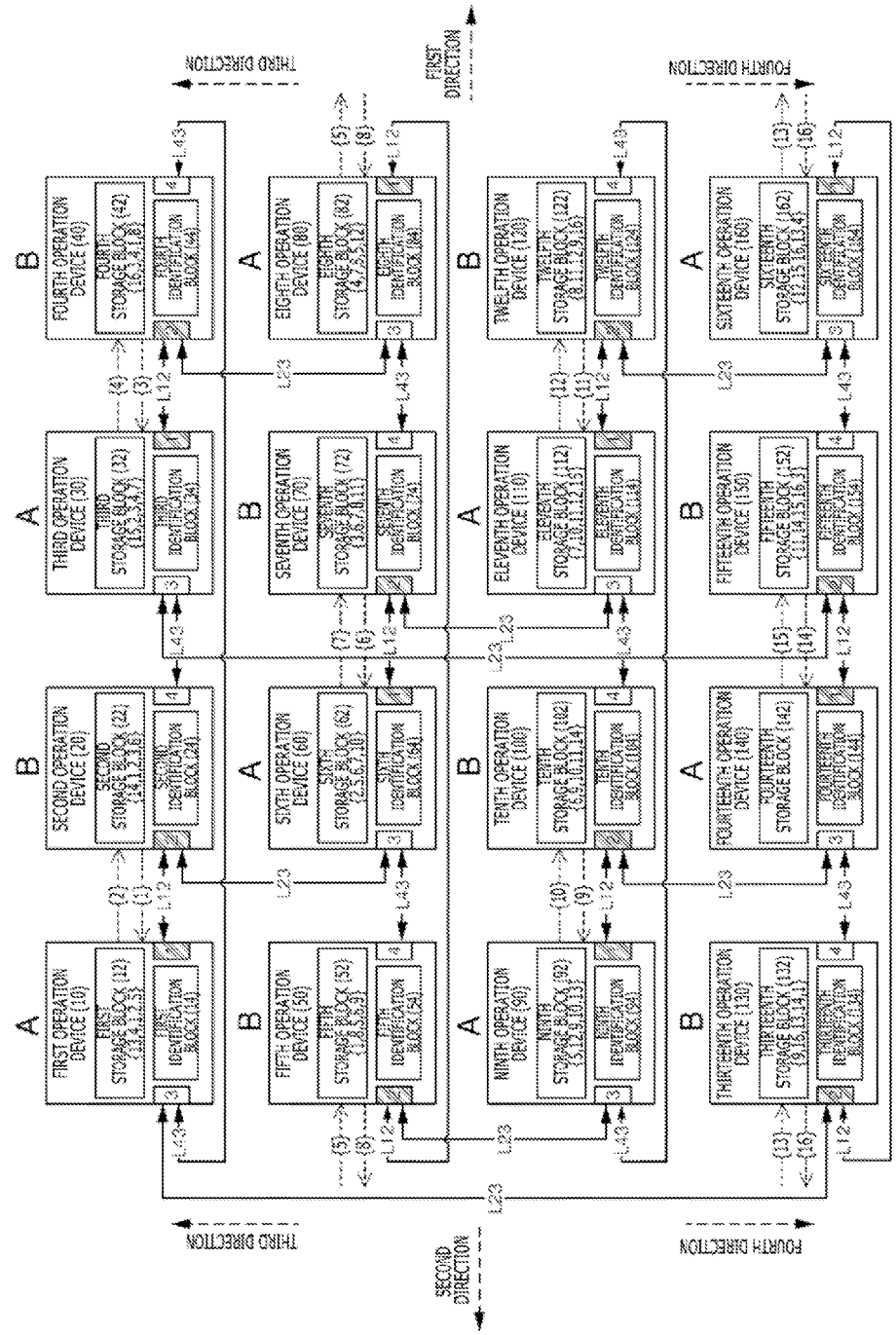
FIGS. 6A to 6D are timing diagrams illustrating an operation of an operation apparatus module shown in FIGS. 4 and 5.
Figure 6B:
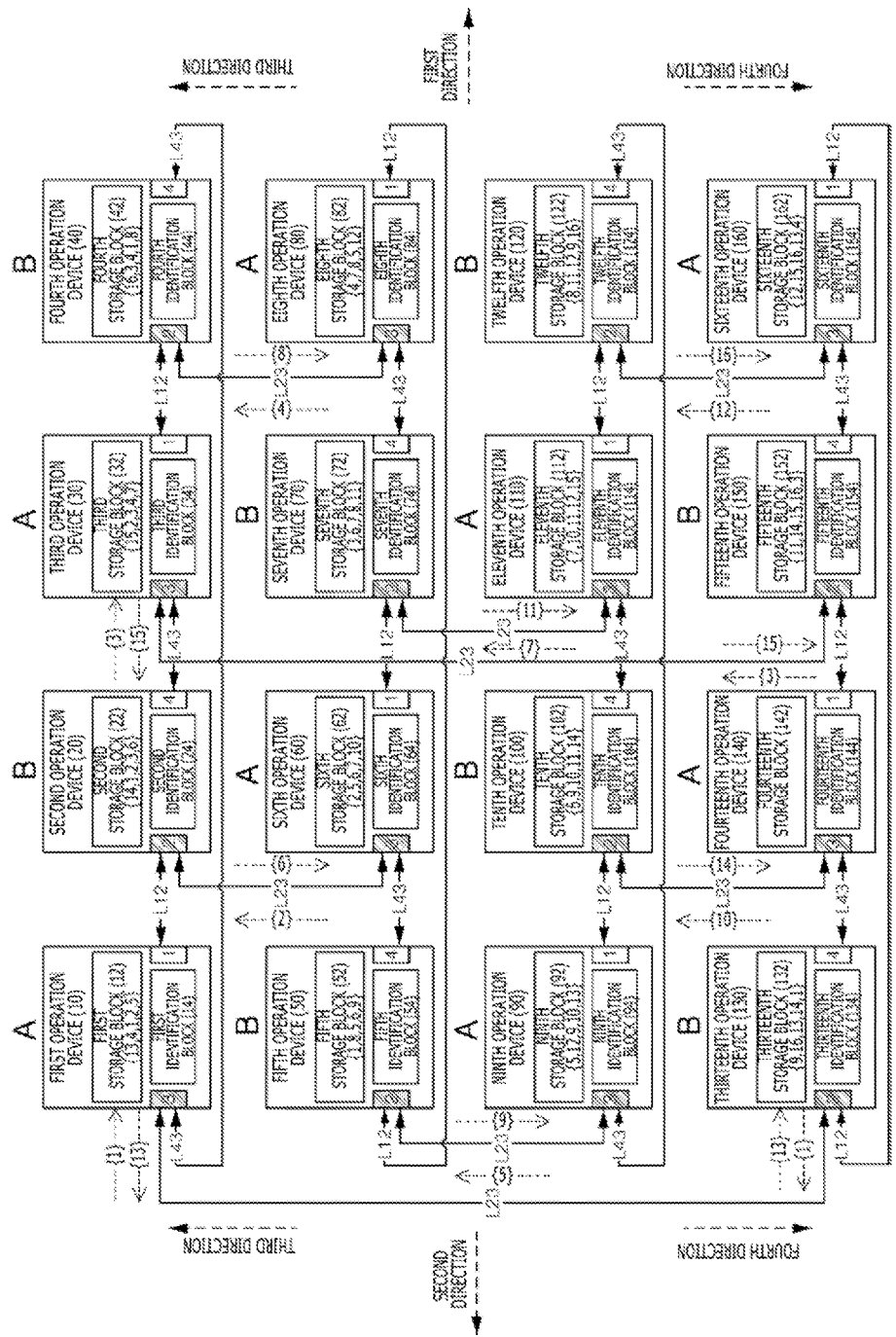

FIG. 6A shows the first overlap period when the first half of the first switch operation overlaps the first half of the third switch operation. For example, during the first overlap period, the first and second signal transmission terminals 1 and 2 may be activated by the first and third switch operations of the first and second operation apparatuses 10 and 20.

In detail, during the first overlap period, the first signal transmission terminal 1 toward the first direction may be activated, and the third signal transmission terminal 3 toward the second and third directions may be deactivated in the first type operation apparatuses A, i.e., the first operation apparatus 10, the third operation apparatus 30, the sixth operation device 60, the eighth operation device 80, the ninth operation device 90, the eleventh operation apparatus 110, the fourteenth operation apparatus 140 and the sixteenth operation apparatus 160.

Further, during the first overlap period, the second signal transmission terminal 2 toward the second and fourth directions may be activated, and the fourth signal transmission terminal 4 toward the first direction may be deactivated in the second type operation apparatuses B, i.e., the second operation apparatus 20, the fourth operation apparatus 40, the fifth operation device 50, the seventh operation device 70, the tenth operation apparatus 100, the twelfth operation apparatus 120, the thirteenth operation apparatus 130 and the fifteenth operation apparatus 150.

Accordingly, the first peer ID Information {1} to {16} may be transferred through the first signal transmission line L12 which couples the first and second signal transmission terminals 1 and 2. Conversely, the first peer ID information {1} to {16} may not be transferred through the second signal transmission line L43 which couples the third and fourth signal transmission terminals 3 and 4 and the third signal transmission line L23 which couples the second and third signal transmission terminals 2 and 3.

For example, during the first switch operation of first 32 cycles (16tck+16tck) of the source clock SCLK in the first overlap period, the first type operation apparatuses A may output the first peer ID information {2}, {4}, {5}, {7}, {10}, {12}, {13} and {15} to the second type operation apparatuses B disposed in the first direction of the first type operation apparatuses A.

In other words, during the first switch operation of first 32 cycles (16tck+16tck) of the source clock SCLK in the first overlap period, the first peer ID information {2} stored in the first peer ID storage unit 121 of the first operation apparatus 10 may be outputted through the first signal transmission terminal 1. For example, the first peer ID information {2} stored in the first peer ID storage unit 121 of the first operation apparatus 10 may be outputted during 2 toggles of the source clock SCLK. The second operation apparatus 20 may receive the first peer ID information {2} inputted through the second signal transmission terminal 2 from the first operation apparatus 10, and the determination unit 246 may determine whether the received first peer ID information {2} has the same value as the self-ID information {2} stored in the self-ID storage unit 228 after 2 toggles of the source clock SCLK.

Similarly, during the first switch operation of first 32 cycles (16tck+16tck) of the source clock SCLK in the first overlap period, the first peer ID information {10} stored in the first peer ID storage unit 921 of the ninth operation apparatus 90 may be outputted through the first signal transmission terminal 1. For example, the first peer ID information {10} stored in the first peer ID storage unit 921 of the ninth operation apparatus 90 may be outputted during 10 toggles of the source clock SCLK. The tenth operation apparatus 100 may receive the first peer ID information {10} inputted through the second signal transmission terminal 2 from the ninth operation apparatus 90, and the determination unit 1046 may determine whether the received first peer ID information {10} has the same value as the self-ID information {10} stored in the self-ID storage unit 1028 after 10 toggles of the source clock SCLK.

For example, during the third switch operation of second 32 cycles (16tck+16tck) of the source clock SCLK in the first overlap period, the second type operation apparatuses B may output the second peer ID information {1}, {3}, {6}, {8}, {9}, {11}, {14} and {16} to the first type operation apparatuses A disposed in the second direction of the second type operation apparatuses B.

In other words, during the third switch operation of second 32 cycles (16tck+16tck) of the source clock SCLK in the first overlap period, the second peer ID information {1} stored in the second peer ID storage unit 222 of the second operation apparatus 20 may be outputted through the second signal transmission terminal 2. For example, the second peer ID information {1} stored in the second peer ID storage unit 222 of the second operation apparatus 20 may be outputted during a single toggle of the source clock SCLK. The first operation apparatus 10 may receive the second peer ID information {1} inputted through the first signal transmission terminal 1 from the second operation apparatus 20, and the determination unit 146 may determine whether the received second peer ID information {1} has the same value as the self-ID information {1} stored in the self-ID storage unit 128 after the single toggle of the source clock SCLK.

Similarly, during the second switch operation of the second 32 cycles (16tck+16tck) of the source clock SCLK in the first overlap period, the second peer ID information {9} stored in the second peer ID storage unit 1022 of the tenth operation apparatus 100 may be outputted through the second signal transmission terminal 2. For example, the second peer ID information {9} stored in the second peer ID storage unit 1022 of the tenth operation apparatus 100 may be outputted during 9 toggles of the source clock. SCLK. The ninth operation apparatus 90 may receive the second peer ID information {9} inputted through the first signal transmission terminal 1 from the tenth operation apparatus 100, and the determination unit 946 may determine whether the received second peer ID information {9} has the same value as the self-ID information {9} stored in the self-ID storage unit 928 after 9 toggles of the source clock SCLK.

FIG. 66 shows the second overlap period when the second half of the third switch operation overlaps the first half of the second switch operation. For example, during the second overlap period, the second and third signal transmission terminals 2 and 3 may be activated by the second and third switch operations of the first and thirteenth operation apparatuses 10 and 130.

In detail, during the second overlap period, the third signal transmission terminal 3 toward the second and third directions may be activated, and the first signal transmission terminal 1 toward the first direction may be deactivated in the first type operation apparatuses A, i.e., the first operation apparatus 10, the third operation apparatus 30, the sixth operation device 60, the eighth operation device 80, the ninth operation device 90, the eleventh operation apparatus 110, the fourteenth operation apparatus 140 and the sixteenth operation apparatus 160.

Further, during the second overlap period, the second signal transmission terminal 2 toward the second and fourth directions may be activated, and the fourth signal transmission terminal 4 toward the first direction may be deactivated in the second type operation apparatuses B, i.e., the second operation apparatus 20, the fourth operation apparatus 40, the fifth operation device 50, the seventh operation device 70, the tenth operation apparatus 100, the twelfth operation apparatus 120, the thirteenth operation apparatus 130 and the fifteenth operation apparatus 150.

Accordingly, the third peer ID information {1} to {16} may be transferred through the third signal transmission line L23 which couples the second and third signal transmission terminals 2 and 3. Conversely, the third peer ID information {1} to {16} may not be transferred through the second signal transmission line L43 which couples the third and fourth signal transmission terminals 3 and 4 and the first signal transmission line L12 which couples the first and second signal transmission terminals 1 and 2.

For example, during the second switch operation of first 32 cycles (16tck+16tck) of the source clock SCLK in the second overlap period, the first type operation apparatuses A may output the third peer ID information {2}, {4}, {5}, {7}, {10}, {12}, {13} and {15} to the second type operation apparatuses B disposed in the third direction of the first type operation apparatuses A.

In other words, during the second switch operation of first 32 cycles (16tck+16tck of the source clock SCLK in the second overlap period, the third peer ID information {13} stored in the third peer ID storage unit 123 of the first operation apparatus 10 may be outputted through the third signal transmission terminal 3. For example, the third peer ID information {13} stored in the third peer ID storage unit 123 of the first operation apparatus 10 may be outputted during 13 toggles of the source clock SCLK. The thirteenth operation apparatus 130 may receive the third peer ID information {13} inputted through the second signal transmission terminal 2 from the first operation apparatus 10, and the determination unit 1346 may determine whether the received third peer ID information {13} has the same value as the self-ID information {13} stored in the self-ID storage unit 1328 after 13 toggles of the source dock SCLK.

Similarly, during the second switch operation of first 32 cycles (16tck+16tck) of the source clock SCLK in the second overlap period, the third peer ID information {5} stored in the third peer ID storage unit 923 of the ninth operation apparatus 90 may be outputted through the third signal transmission terminal 3. For example, the third peer ID information {5} stored in the third peer ID storage unit 923 of the ninth operation apparatus 90 may be outputted during 5 toggles of the source clock SCLK. The fifth operation apparatus 50 may receive the third peer ID information {5} inputted through the second signal transmission terminal 2 from the ninth operation apparatus 90, and the determination unit 546 may determine whether the received third peer ID information {5} has the same value as the self-ID information {5} stored in the self-ID storage unit 528 after 5 toggles of the source clock SCLK.

For example, during the third switch operation of second 32 cycles (16tck+16tck) of the source clock SCLK in the second overlap period, the second type operation apparatuses B may output the fourth peer ID information {1}, {3}, {6}, {8}, {9}, {11}, {14} and {16} to the first type operation apparatuses A disposed in the fourth direction of the second type operation apparatuses B.

In other words, during the third switch operation of second 32 cycles (16 ck+16tck) of the source clock SCLK in the second overlap period the fourth peer ID information {1} stored in the fourth peer ID storage unit 1324 of the thirteenth operation apparatus 130 may be outputted through the second signal transmission terminal 2. For example, the fourth peer ID information {1} stored in the fourth peer ID storage unit 1324 of the thirteenth operation apparatus 130 may be outputted during a single toggle of the source clock SCLK. The first operation apparatus 10 may receive the fourth peer ID information {1} inputted through the third signal transmission terminal 3 from the thirteenth operation apparatus 130, and the determination unit 146 may determine whether the received fourth peer ID information {1} has the same value as the self-ID information {1} stored in the self-ID storage unit 128 after the single toggle of the source clock SCLK.

Similarly, during the third switch operation of second 32 cycles (16tck+16tck) of the source clock SCLK in the second overlap period, the fourth peer ID information {9} stored in the fourth peer ID storage unit 524 of the fifth operation apparatus 50 may be outputted through the second signal transmission terminal 2. For example, the fourth peer ID information {9} stored in the fourth peer ID storage unit 522 of the fifth operation apparatus 50 may be outputted during 9 toggles of the source clock SCLK. The ninth operation apparatus 90 may receive the fourth peer ID information {9} inputted through the third signal transmission terminal 3 from the fifth operation apparatus 50, and the determination unit 946 may determine whether the received fourth peer ID information {9} has the same value as the self-ID information {9} stored in the self-ID storage unit 928 after 9 toggles of the source clock SCLK.

Figure 6C:
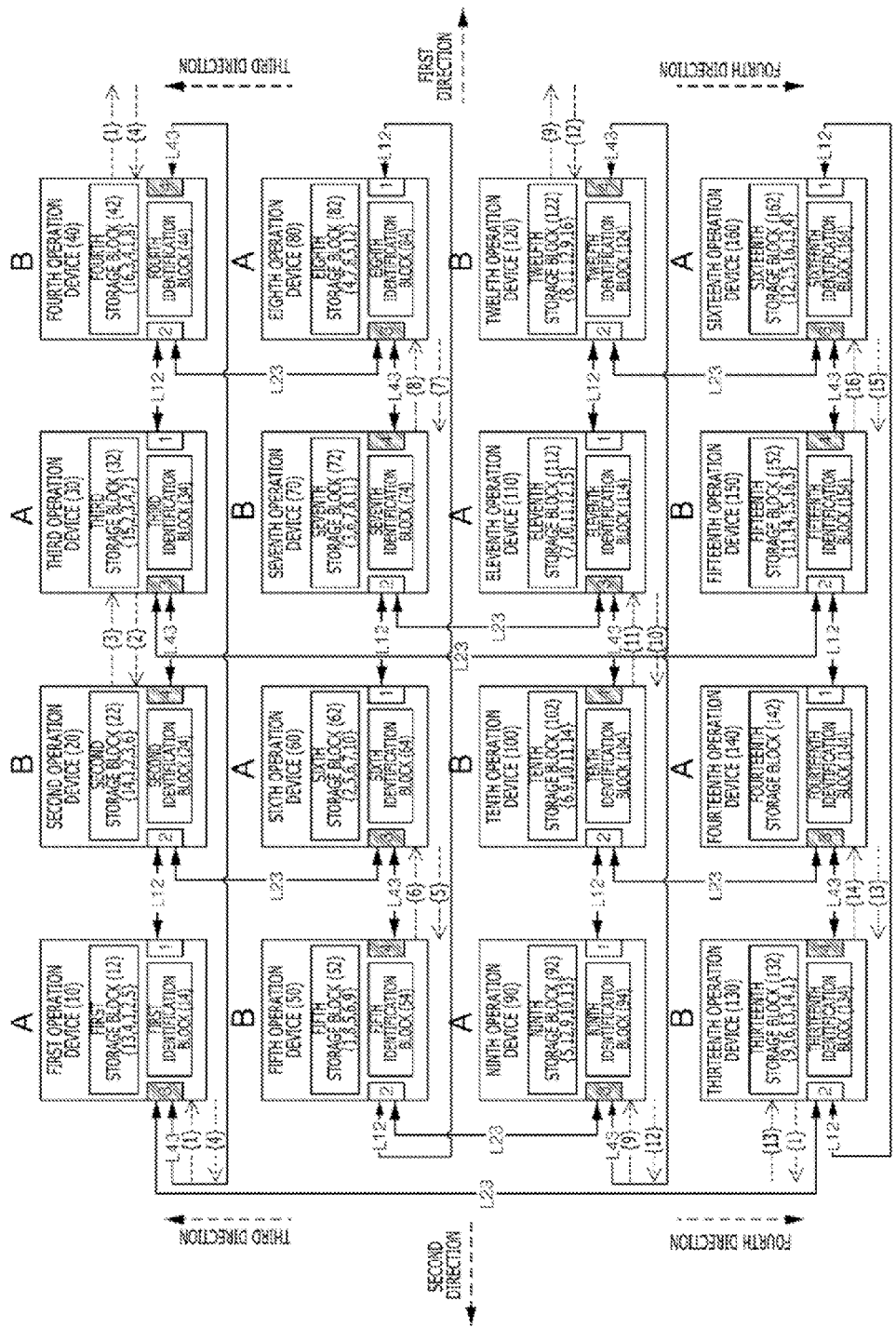

FIG. 6C shows the third overlap period when the second half of the second switch operation overlaps the first half of the fourth switch operation. For example, during the third overlap period, the third and fourth signal transmission terminals 3 and 4 may be activated by the second and fourth switch operations of the first and fourth operation apparatuses 10 and 40.

In detail, during the third overlap period, the first signal transmission terminal 1 toward the first direction is deactivated, and the third signal transmission terminal 3 toward the second and third directions may be activated in the first type operation apparatuses A, i.e., the first operation apparatus 10, the third operation apparatus 30, the sixth operation device 60, the eighth operation device 80, the ninth operation device 90, the eleventh operation apparatus 110, the fourteenth operation apparatus 140 and the sixteenth operation apparatus 160.

Further, during the third overlap period, the second signal transmission terminal 2 toward the second and fourth directions may be deactivated, and the fourth signal transmission terminal 4 toward the first direction may be activated in the second type operation apparatuses B, i.e., the second operation apparatus 20, the fourth operation apparatus 40, the fifth operation device 50 the seventh operation apparatus 70, the tenth operation apparatus 100, the twelfth operation apparatus 120, the thirteenth operation apparatus 130 and the fifteenth operation apparatus 150.

Accordingly, the second peer ID information {1} to {16} may be transferred through the second signal transmission line L43 which couples the third and fourth signal transmission terminals 3 and 4. Conversely, the second peer ID information {1} to {16} may not be transferred through the third signal transmission line L23 which couples the second and third signal transmission terminals 2 and 3 and the first signal transmission line L12 which couples the first and second signal transmission terminals 1 and 2.

For example, during the second switch operation of first 32 cycles (16tck+16tck) of the source clock SCLK in the third overlap period, the first type operation apparatuses A may output the second peer ID information {2}, {4}, {5}, {7}, {10}, {12}, {13} and {15} to the second type operation apparatuses B disposed in the second direction of the first type operation apparatuses A.

In other words, during the second switch operation of first 32 cycles 16tck+16tck) of the source clock SCLK in the third overlap period, the second peer ID information {4} stored in the second peer ID storage unit 122 of the first operation apparatus 10 may be outputted through the third signal transmission terminal 3, For example, the second peer ID information {4} stored in the second peer ID storage unit 122 of the first operation apparatus 10 may be outputted during 4 toggles of the source dock SCLK. The fourth operation apparatus 40 may receive the second peer ID information {4} inputted through the fourth signal transmission terminal 4 from the first operation apparatus 10, and the determination unit 446 may determine whether the received second peer ID information {4} has the same value as the self-ID information {4} stored in the self-ID storage unit 428 after 4 toggles of the source clock SCLK.

Similarly, during the second switch operation of first 32 cycles (16tck+16tck) of the source clock SCLK in the third overlap period, the second peer ID information {12} stored in the second peer ID storage unit 922 of the ninth operation apparatus 90 may be outputted through the third signal transmission terminal 3. For example, the second peer ID information {12} stored in the second peer ID storage unit 922 of the ninth operation apparatus 90 may be outputted during 12 toggles of the source clock SCLK. The twelfth operation apparatus 120 may receive the second peer ID information {12} inputted through the fourth signal transmission terminal 4 from the ninth operation apparatus 90, and the determination unit 1246 may determine whether the received second peer ID information {12} has the same value as the self-ID information {12} stored in the self-ID storage unit 1228 after 12 toggles of the source clock SCLK.

For example, during the fourth switch operation of second 32 cycles (16tck+16tck) of the source clock SCLK in the third overlap period, the second type operation apparatuses B may output the first peer ID information {1}, {3}, {6}, {8}, {9}, {11}, {14} and {16} to the first type operation apparatuses A disposed in the first direction of the second type operation apparatuses B.

In other words, during the fourth switch operation of second 32 cycles (16tck+16tck) of the source clock SCLK in the third overlap period, the first peer ID information {1} stored in the first peer ID storage unit 421 of the fourth operation apparatus 40 may be outputted through the fourth signal transmission terminal 4. For example, the first peer ID information {1} stored in the first peer ID storage unit 421 of the fourth operation apparatus 40 may be outputted during a single toggle of the source clock SCLK. The first operation apparatus 10 may receive the first peer ID information {1} inputted through the third signal transmission terminal 3 from the fourth operation apparatus 40, and the determination unit 146 may determine whether the received first peer ID information {1} has the same value as the self-ID information {1} stored in the self-ID storage unit 128 after the single toggle of the source clock SCLK.

Similarly, during the fourth switch operation of the second 32 cycles (16tck±16tck) of the source clock SCLK in the third overlap period, the second peer ID information {9} stored in the second peer ID storage unit 1222 of the twelfth operation apparatus 120 may be outputted through the fourth signal transmission terminal 4. For example, the second peer ID information {9} stored in the second peer ID storage unit 1222 of the twelfth operation apparatus 120 may be outputted during 9 toggles of the source clock SCLK. The ninth operation apparatus 90 may receive the second peer ID information {9} inputted through the third signal transmission terminal 3 from the twelfth operation apparatus 120, and the determination unit 946 may determine whether the received second peer ID information {9} has the same value as the self-ID information {9} stored in the self-ID storage unit 928 after 9 toggles of the source clock SCLK.

Figure 6D:
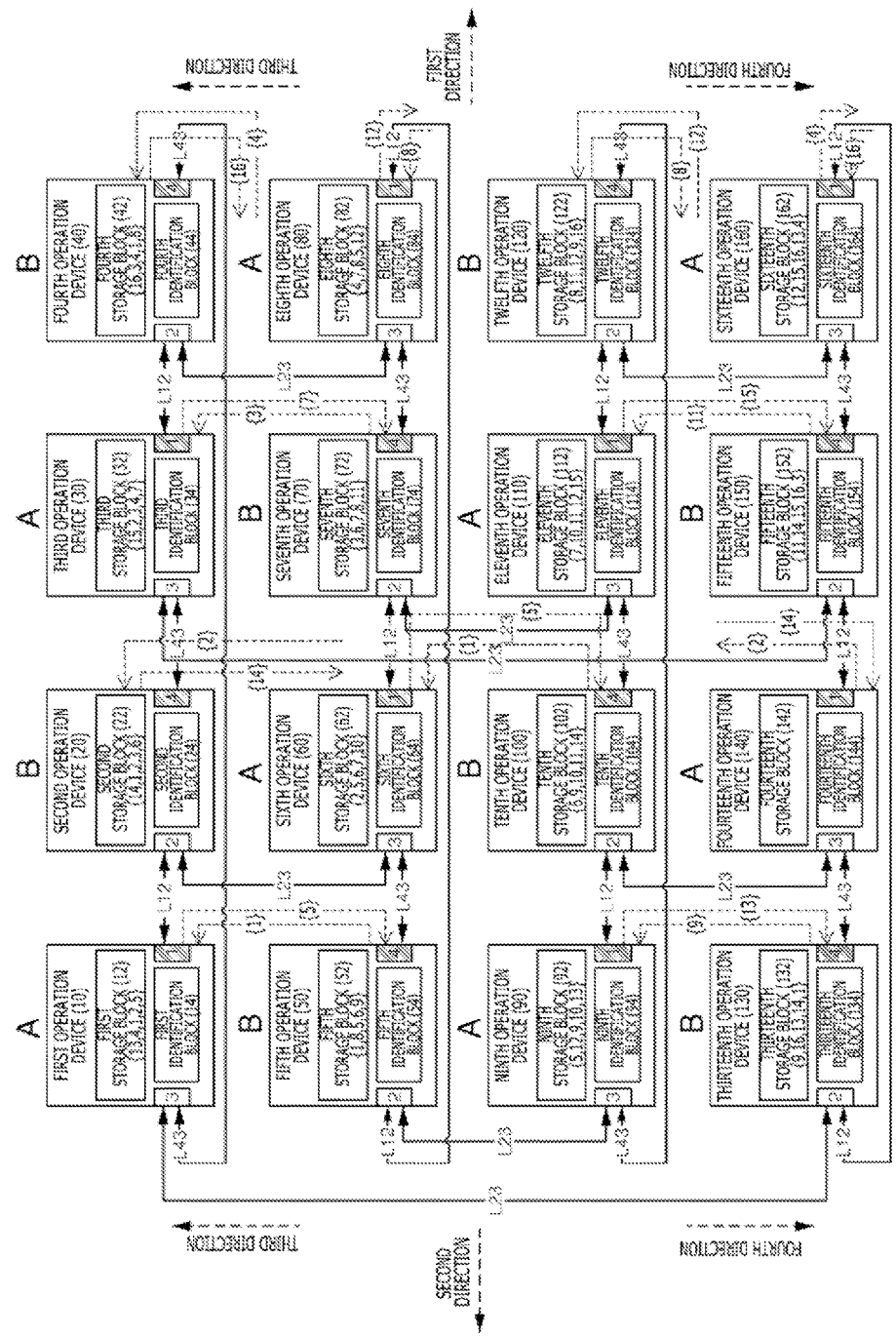

FIG. 6D shows the second half of the fourth switch operation overlaps the second half of the first switch operation. For example, during the fourth overlap period, the first and fourth signal transmission terminals 1 and 4 are activated by the first and fourth switch operations of the first and sixth operation apparatuses 10 and 60 and the second and fifth operation apparatuses 20 and 50.

In detail, during the fourth overlap period, the first signal transmission terminal 1 toward the first direction may be activated, and the third signal transmission terminal 3 toward the second and third directions may be deactivated in the first type operation apparatuses A, i.e., the first operation apparatus 10, the third operation apparatus 30, the sixth operation device 60, the eighth operation device 80, the ninth operation device 90, the eleventh operation apparatus 110, the fourteenth operation apparatus 140 and the sixteenth operation apparatus 160.

Further, during the fourth overlap period, the second signal transmission terminal 2 toward the second and fourth directions may be deactivated, and the fourth signal transmission terminal 4 toward the first direction may be activated in the second type operation apparatuses B, i.e., the second operation apparatus 20, the fourth operation apparatus 40, the fifth operation device 50, the seventh operation device 70 the tenth operation apparatus 100, the twelfth operation apparatus 120, the thirteenth operation apparatus 130 and the fifteenth operation apparatus 150.

Accordingly, fourth peer ID information {1} to {16} may be transferred through the first signal transmission line L12 which couples the first and second signal transmission terminals 1 and 2, the third signal transmission line L23 which couples the second signal transmission terminal 2 and the third signal transmission terminal 3, and the second signal transmission line L43 which couples the third and fourth signal transmission terminals 3 and 4. It is possible to transmit the fourth peer ID information {1} to {16} through the first signal transmission line L12, the third signal transmission line L23, and the second signal transmission line L43 due to bypasses of the deactivated second and third signal transmission terminals 3 and 4 between the first signal transmission line L12 and the third signal transmission line L23 and between the third signal transmission line L23 and the second signal transmission line L43.

For example, during the first switch operation of first 32 cycles (16tck+16tck) of the source dock SCLK in the fourth overlap period, the first type operation apparatuses A may output the fourth peer ID information {2}, {4}, {5}, {7}, {10}, {12}, {13} and {15} to the second type operation apparatuses B disposed in the fourth direction of the first type operation apparatuses A.

In other words, during the first switch operation of first 32 cycles (16tck+16tck) of the source clock SCLK in the fourth overlap period, the fourth peer ID information {5} stored in the fourth peer ID storage unit 124 of the first operation apparatus 10 may be outputted through the first signal transmission terminal 1. For example, the fourth peer ID information {5} stored in the fourth peer ID storage unit 124 of the first operation apparatus 10 may be outputted during 5 toggles of the source clock SCLK. The fourth peer ID information {5} may be transmitted through the first signal transmission line L12, the third signal transmission line L23, and the second signal transmission line L43. The fifth operation apparatus 50 may receive the fourth peer ID information {5} inputted through the fourth signal transmission terminal 4 from the first operation apparatus 10 and the determination unit 546 may determine whether the received fourth peer ID information {5} has the same value as the self-ID information {5} stored in the self-ID storage unit 528 after 5 toggles of the source clock SCLK.

Similarly, during the first switch operation of first 32 cycles (16tck+16tck) of the source clock SCLK in the fourth overlap period, the fourth peer ID information {13} stored in the fourth peer ID storage unit 922 of the ninth operation apparatus 90 may be outputted through the first signal transmission terminal 1. For example, the fourth peer ID information {13} stored in the fourth peer ID storage unit 922 of the ninth operation apparatus 90 may be outputted during 13 toggles of the source clock SCLK. The fourth peer ID information {13} may be transmitted through the first signal transmission line L12, the third signal transmission line L23, and the second signal transmission line L43. The thirteenth operation apparatus 130 may receive the fourth peer ID information {13} inputted through the fourth signal transmission terminal 4 from the ninth operation apparatus 90, and the determination unit 1346 may determine whether the received fourth peer ID information {13} has the same value as the self-ID information {13} stored in the self-ID storage unit 1228 after 13 toggles of the source clock SCLK.

For example, during the fourth switch operation of second 32 cycles (16tck+16tck) of the source clock SCLK in the fourth overlap period, the second type operation apparatuses B may output the first peer ID information {1}, {3}, {6}, {8}, {9}, {11}, {14} and {16} to the first type operation apparatuses A disposed in the third direction of the second type operation apparatuses B.

In other words, during the fourth switch operation of second 32 cycles (16tck+16tck) of the source clock SCLK in the fourth overlap period, the third peer ID information {1} stored in the third peer ID storage unit 523 of the fifth operation apparatus 50 may be outputted through the fourth signal transmission terminal 4. For example, the third peer ID information {1} stored in the third peer ID storage unit 523 of the fifth operation apparatus 50 may be outputted during a single toggle of the source dock SCLK. The third peer ID information {1} may be transmitted through the second signal transmission line L43, the third signal transmission line L23, and the first signal transmission line L12. The first operation apparatus 10 may receive the third peer ID information {1} inputted through the first signal transmission terminal 1 from the fifth operation apparatus 50, and the determination unit 146 may determine whether the received third peer ID information {1} has the same value as the self-ID information {1} stored in the self-ID storage unit 128 after the single toggle of the source clock SCLK.

Similarly, during the fourth switch operation of the second 32 cycles (16tck+16tck) of the source clock SCLK in the fourth overlap period, the third peer ID information {9} stored in the third peer ID storage unit 1323 of the thirteenth operation apparatus 130 may be outputted through the fourth signal transmission terminal 4. For example, the third peer ID information {9} stored in the third peer ID storage unit 1323 of the thirteenth operation apparatus 130 may be outputted during 9 toggles of the source clock SCLK. The third peer ID information {9} may be transmitted through the second signal transmission line L43, the third signal transmission line L23, and the first signal transmission line L12. The ninth operation apparatus 90 may receive the third peer ID information {9} inputted through the first signal transmission terminal 1 from the thirteenth operation apparatus 130, and the determination unit 946 may determine whether the received third peer ID information {9} has the same value as the self-ID information {9} stored in the self-ID storage unit 928 after 9 toggles of the source clock SCLK.

As described above as an example, the operation apparatus module may comprise the first to sixteenth operation apparatuses 10 to 160. Accordingly, 4-bit data are sufficient for the first to fourth peer ID information {1} to {16} of the first to sixteenth operation apparatuses 10 to 160. Sixteen (16) toggles of the source clock SCLK may be required at maximum. However, the above description exemplarily discloses that the first to fourth peer ID information {1} to {16} is transferred during each of the first to fourth switch operations of first and second 16 cycles of the source clock SCLK in order to secure a sufficient margin midway due to the continuous transmission of the first to fourth peer ID information {1} to {16}, and in preparation for the lack of means for simultaneously applying the source clock SCLK to all of the first to sixteenth operation apparatuses 10 to 160. The margin of 16 cycles (16tck) of the source clock SCLK after the transmission of the first to fourth peer ID information {1} to {16} in each of the first and second 16 cycles, as shown in FIGS. 6A to 6D, is an example, which may vary according to design.

As is apparent from the above descriptions, according to the embodiments, in an operation apparatus module in which a plurality of operation apparatuses of the same operation are disposed in a preset pattern, the plurality of operation apparatuses may recognize, by themselves, their disposition in the preset pattern. That is to say, each operation apparatus of a single operation apparatus module may check its disposition and may determine whether to perform a subsequent operation.

Due to this fact, it is possible to prevent the operation apparatuses of one operation apparatus module from being reused.

Although various embodiments have been described for illustrative purposes, it will be apparent to those skilled in the art that various changes and modifications may be made without departing from the spirit and scope of the invention as defined in the following claims.

What is claimed is:

1. An operation apparatus module comprising:
    a plurality of operation apparatuses disposed in a preset pattern, each of the plurality of operation apparatuses comprising:
    a storage block suitable for storing self-identification information for identifying a corresponding operation apparatus and peer identification information for identifying one or more peer operation apparatuses of the corresponding operation apparatus; and
    an identification block suitable for managing the preset pattern by comparing the self-identification information stored in the storage block with the peer identification information transmitted from the peer operation apparatuses,
    wherein the plurality of operation apparatuses include one or more odd numbered operation apparatuses and one or more even numbered operation apparatuses, wherein the odd numbered operation apparatus includes first and third terminals, and the even numbered operation apparatus includes second and fourth terminals, and wherein signal transmission lines are coupled between the first and second terminals and between the third and fourth terminals.

2. The operation apparatus module of claim 1, wherein the storage block comprises:
a self-identification storage unit suitable for storing the self-identification information;
a first peer identification storage unit suitable for storing first peer identification information for identifying a first one of the peer operation apparatuses; and
a second peer identification storage unit suitable for storing second peer identification information for identifying a second one of the peer operation apparatuses.

3. The operation apparatus module of claim 2, wherein the identification block comprises:
an activation control unit suitable for alternately activating a group of the first and second terminals and a group of the third and fourth terminals;
an output unit suitable for alternately outputting the first and second peer identification information to the peer operation apparatuses according to the alternate activation; and
a determination unit suitable for comparing the self-identification information stored in the self-identification storage unit with the peer identification information transmitted from the peer operation apparatuses, and determining whether they are substantially the same as each other.

4. The operation apparatus module of claim 3, wherein the activation control unit alternately activates the group of the first and second terminals and the group of the third and fourth terminals according to a predetermined toggle number of a source clock.

5. The operation apparatus module of claim 4,
wherein the activation control unit of the odd numbered operation apparatus sequentially activates the first and third terminals according to the predetermined toggle number of a source clock, and
wherein the activation control unit of the even numbered operation apparatus sequentially activates the second and fourth terminals according to the predetermined toggle number of a source clock.

6. The operation apparatus module of claim 5,
wherein the output unit of the odd numbered operation apparatus outputs the first peer identification information to a first one of the peer operation apparatuses through the first terminal, which is activated, and outputs the second peer identification information to a second one of the peer operation apparatuses through the third terminal, which is activated, and
wherein the output unit of the even numbered operation apparatus outputs the first peer identification information to a third one of the peer operation apparatuses through the fourth terminal, which is activated, and outputs the second peer identification information to a fourth one of the peer operation apparatuses through the second terminal, which is activated.

7. The operation apparatus module of claim 6,
wherein the determination unit of the odd numbered operation apparatus determines whether the second peer identification information inputted through the first terminal, which is activated, and the self-identification information stored in the self-identification storage unit are substantially the same as each other, wherein the determination unit of the odd numbered operation apparatus determines whether the first peer identification information inputted through the second terminal, which is activated, and the self-identification information stored in the self-identification storage unit are substantially the same as each other, wherein the determination unit of the even numbered operation apparatus determines whether the first peer identification information inputted through the second terminal, which is activated, and the self-identification information stored in the self-identification storage unit are substantially the same as each other, wherein the determination unit of the even numbered operation apparatus determines whether the second peer identification information inputted through the fourth terminal, which is activated, and the self-identification information stored in the self-identification storage unit are substantially the same as each other, and wherein the operation apparatus module performs a normal operation when all results of the determination are positive.

8. An operation apparatus module comprising:
a plurality of operation apparatuses disposed in a preset pattern, each of the plurality of operation apparatuses comprising:
a storage block suitable for storing self-identification information for identifying a corresponding operation apparatus and peer identification information for identifying one or more peer operation apparatuses of the corresponding operation apparatus; and
an identification block suitable for managing the preset pattern by comparing the self-identification information stored in the storage block with the peer identification information transmitted from the peer operation apparatuses,
wherein the plurality of operation apparatuses are classified as:
first type operation apparatuses each including a first signal transmission terminal in a first direction and a third signal transmission terminal in a second direction and a third direction according to a disposition type by the preset pattern; and
second type operation apparatuses each including a fourth signal transmission terminal in the first direction and a second signal transmission terminal in the second direction and a fourth direction, and
wherein the first direction and the second direction are opposite to each other, the third direction and the fourth direction are opposite to each other, and the first direction and the second direction cross with the third direction and the fourth direction.

9. The operation apparatus module of claim 8,
wherein the first type operation apparatuses and the second type operation apparatuses are alternately disposed in an array between the first direction and the second direction and between the third direction and the fourth direction, and
wherein signal transmission lines are coupled between the first signal transmission terminal and the second signal transmission terminal, between the fourth signal transmission terminal and the third signal transmission terminal, and between the third signal transmission terminal and the second signal transmission terminal.

10. The operation apparatus module of claim 9, wherein the storage block comprises:
- a type storage unit suitable for storing information representing that the corresponding operation device corresponds to which operation device between a first type operation apparatus and a second type operation apparatus;
- a self-ID storage unit suitable for storing self-ID information for identifying the corresponding operation device;
- a first peer ID storage unit suitable for storing first peer ID information for identifying an operation device which is disposed in the first direction from the corresponding operation device;
- a second peer ID storage unit suitable for storing second peer ID information for identifying an operation device which is disposed in the second direction from the corresponding operation device;
- a third peer ID storage unit suitable for store third peer ID information for identifying an operation device which is disposed in the third direction from the corresponding operation device; and
- a fourth peer ID storage unit suitable for storing fourth peer ID information for identifying an operation device which is disposed in the fourth direction from the corresponding operation device.

11. The operation apparatus module of claim 10, wherein the identification block comprises:
- an activation control unit suitable for activating any one group and deactivating the other groups among a group of the first and second signal transmission terminals, a group of the second and third signal transmission terminals, a group of the third and fourth signal transmission terminals and a group of the first and fourth signal transmission terminals, during an entry period of the identification operation period;
- an output unit suitable for outputting a value stored in any one identification storage unit of the first to fourth peer ID storage units of the corresponding operation device according to an operation of the activation control unit, to an exterior of the corresponding operation device, during the identification operation period; and
- a determination unit suitable for comparing a value inputted from the exterior of the corresponding operation device and a value stored in a self-ID storage unit according to the operation of the activation control unit, and determining whether they correspond to each other, during the identification operation period.

12. The operation apparatus module of claim 11,
wherein the activation control unit checks a value stored in the type storage unit at an entry time to the identification operation period, and performs an initializing operation of activating any one group and deactivating the other groups among the group of the first and second signal transmission terminals, the group of the second and third signal transmission terminals, the group of the third and fourth signal transmission terminals and the group of the first and fourth signal transmission terminals, according to a checking result, and wherein, during the identification operation period after the initializing operation, the activation control unit performs an activating operation of alternately activating the group of the first and second signal transmission terminals, the group of the second and third signal transmission terminals, the group of the third and fourth signal transmission terminals and the group of the first and fourth signal transmission terminals, one group at a time, according to preset order, based on a preset number of source clock toggles.

13. The operation apparatus module of claim 12,
wherein, when it is determined as a result of the initializing operation that the corresponding operation device is a first type, the activation control unit selectively performs any one operation of a first switch operation of activating the first signal transmission terminal and deactivating the third signal transmission terminal based on the preset number of source clock toggles and a second switch operation of deactivating the first signal transmission terminal and activating the third signal transmission terminal based on the preset number of source clock toggles, during the identification operation period, and wherein, when it is determined as a result of the initializing operation that the corresponding operation device is a second type, the activation control unit selectively performs any one operation of a third switch operation of activating the second signal transmission terminal and deactivating the fourth signal transmission terminal based on the preset number of source clock toggles and a fourth switch operation of deactivating the second signal transmission terminal and activating the fourth signal transmission terminal based on the preset number of source clock toggles, during the identification operation period.

14. The operation apparatus module of claim 13,
wherein, in the activation control unit, one half of a period in which the first switch operation is performed overlaps with one half of a period in which the third switch operation is performed, and the other half of the period in which the first switch operation is performed overlaps with one half of a period in which the fourth switch operation is performed, and wherein, in the activation control unit, one half of a period in which the second switch operation is performed overlaps with the other half of the period in which the third switch operation is performed, not overlapping with the period in which the first switch operation is performed, and the other half of the period in which the second switch operation is performed overlaps with the other half of the period in which the fourth switch operation is performed, not overlapping with the period in which the first switch operation is performed.

15. The operation apparatus module of claim 14, wherein, when it is determined as a result of the initializing operation that the corresponding operation device is the first type,
the output unit outputs a value stored in the first peer ID storage unit of the corresponding operation device, to the first direction, through the first signal transmission terminal, during the period in which the first switch operation is performed and during a period overlapping with the period in which the third switch operation is performed, the output unit outputs a value stored in the fourth peer ID storage unit of the corresponding operation device, to the first direction, through the first signal transmission terminal, bypasses a value inputted from the third direction through the third signal transmission terminal, to the second direction, and bypasses a value inputted from the second direction through the third signal transmission terminal, to the third direction, during the period in which the first switch operation is performed and during a period overlapping with the period in which the fourth switch operation is performed, the output unit outputs a value stored in the third peer ID storage unit of the corresponding operation device, to the third direction, through the third signal transmission terminal, during the period in which the second switch operation is performed and during a period overlapping with the period in which the third switch operation is performed, and the output unit outputs a value stored in the second peer ID storage unit of the corresponding operation device, to the second direction, through the third signal transmission terminal, during the period in which the second switch operation is performed and during a period overlapping with the period in which the fourth switch operation is performed.

16. The operation apparatus module of claim 15, wherein, when it is determined as a result of the initializing operation that the corresponding operation device is the second type, the output unit outputs a value stored in the second peer ID storage unit of the corresponding operation device, to the second direction, through the second signal transmission terminal, during the period in which the third switch operation is performed and during a period overlapping with the period in which the first switch operation is performed, the output unit outputs a value stored in the fourth peer ID storage unit of the corresponding operation device, to the fourth direction, through the second signal transmission terminal, during the period in which the third switch operation is performed and during a period overlapping with the period in which the second switch operation is performed, the output unit outputs a value stored in the third peer ID storage unit of the corresponding operation device, to the first direction, through the fourth signal transmission terminal, bypasses a value inputted from the second direction through the second signal transmission terminal, to the fourth direction, and bypasses a value inputted from the fourth direction through the second signal transmission terminal, to the second direction, during the period in which the fourth switch operation is performed and during a period overlapping with the period in which the first switch operation is performed, and the output unit outputs a value stored in the first peer ID storage unit of the corresponding operation device, to the first direction, through the fourth signal transmission terminal, during the period in which the fourth switch operation is performed and during a period overlapping with the period in which the second switch operation is performed.

17. The operation apparatus module of claim 16, wherein, when it is determined as a result of the initializing operation that the corresponding operation device is the first type, the determination unit performs:

a first determination operation of comparing a value inputted from the first direction through the first signal transmission terminal and the value stored in the self-ID storage unit of the corresponding operation device and determining whether they correspond to each other, during the period in which the first switch operation is performed;

a second determination operation of comparing a value inputted from the third direction through the third signal transmission terminal and the value stored in the self-ID storage unit of the corresponding operation device and determining whether they correspond to each other, during the period in which the second switch operation is performed and during a period overlapping with the period in which the third switch operation is performed; and a third determination operation of comparing a value inputted from the second direction through the third signal transmission terminal and the value stored in the self-ID storage unit of the corresponding operation device and determining whether they correspond to each other, during the period in which the second switch operation is performed and during a period overlapping with the period in which the fourth switch operation is performed, and wherein the determination unit exits the identification operation period when all the values compared in the first to third determination operations correspond to each other.

18. The operation apparatus module of claim 17, wherein, when it is determined as a result of the initializing operation that the corresponding operation device is the second type, the determination unit performs:

a fourth determination operation of comparing a value inputted from the second direction through the second signal transmission terminal and the value stored in the self-ID storage unit of the corresponding operation device and determining whether they correspond to each other, during the period in which the third switch operation is performed and during a period overlapping with the period in which the first switch operation is performed;

a fifth determination operation of comparing a value inputted from the fourth direction through the second signal transmission terminal and the value stored in the self-ID storage unit of the corresponding operation device and determining whether they correspond to each other, during the period in which the third switch operation is performed and during a period overlapping with the period in which the second switch operation is performed; and a sixth determination operation of comparing a value inputted from the first direction through the fourth signal transmission terminal and the value stored in the self-ID storage unit of the corresponding operation device and determining whether they correspond to each other, during the period in which the fourth switch operation is performed, and wherein the determination unit exits the identification operation period when all the values compared in the fourth to sixth determination operations correspond to each other.

* * * * *